(12) United States Patent
Yoshioka

(10) Patent No.: US 10,977,318 B2
(45) Date of Patent: Apr. 13, 2021

(54) SEARCH APPARATUS, SEARCH METHOD, SEARCH PROGRAM, AND RECORDING MEDIUM

(75) Inventor: Takumi Yoshioka, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 555 days.

(21) Appl. No.: 14/366,979

(22) PCT Filed: Jul. 4, 2012

(86) PCT No.: PCT/JP2012/067095
§ 371 (c)(1),
(2), (4) Date: Sep. 23, 2014

(87) PCT Pub. No.: WO2013/099328
PCT Pub. Date: Jul. 4, 2013

(65) Prior Publication Data
US 2015/0066982 A1    Mar. 5, 2015

(30) Foreign Application Priority Data
Dec. 28, 2011    (JP) .............................. JP2011-288769

(51) Int. Cl.
*G06F 16/951* (2019.01)
*G06F 16/33* (2019.01)
(52) U.S. Cl.
CPC .......... *G06F 16/951* (2019.01); *G06F 16/334* (2019.01)
(58) Field of Classification Search
CPC ......... G06F 17/30864; G06F 17/30675; G06F 17/30
(Continued)

(56) References Cited

U.S. PATENT DOCUMENTS

| 7,657,515 B1 * | 2/2010 | Jewell ................. G06F 16/3332 |
| | | 707/999.003 |
| 2004/0243595 A1 * | 12/2004 | Cui ..................... G06F 16/2471 |

(Continued)

FOREIGN PATENT DOCUMENTS

| JP | 2002-092033 A | 3/2002 |
| TW | 200725320 A | 7/2007 |
| TW | 200943277 A | 10/2009 |

OTHER PUBLICATIONS

International Search Report for PCT/JP2012/067095 dated Sep. 11, 2012.

*Primary Examiner* — Hosain T Alam
*Assistant Examiner* — Tracy M McGhee
(74) *Attorney, Agent, or Firm* — Sughrue Mion, PLLC

(57) ABSTRACT

Even when a user specifies a plurality of keywords as a search condition, it is possible to provide information of search objects that are commercially advantageous for the user. A search apparatus divides a plurality of keywords specified as a search condition into two child search conditions, each of which includes at least one keyword. The search apparatus searches for a search object that matches all the keywords specified as the search condition. The search apparatus searches for search objects that match all the keywords included in one of the child search conditions and search objects that match all the keywords included in the other of the child search conditions. The search apparatus extracts combinations of search objects having predetermined relationship to each other from among combinations of any one of search objects found by the one of the child search conditions and any one of search objects found by the other of the child search conditions. The search apparatus identifies a combination that is more commercially advantageous for the user than the search object found by the specified search condition from among the combinations.

(Continued)

The search apparatus provides information of the identified combination.

20 Claims, 16 Drawing Sheets

(58) Field of Classification Search
USPC .......................................................... 707/770
See application file for complete search history.

(56) References Cited

U.S. PATENT DOCUMENTS

2007/0150320 A1* 6/2007 Huang ................... G06Q 10/02
 705/5
2007/0156669 A1* 7/2007 Marchisio ......... G06F 17/30731
 707/999.004
2009/0254542 A1* 10/2009 Kang .................. G06F 16/3338

* cited by examiner

FIG.3A
FOUND ACCOMMODATION FACILITIES

| ACCOMMODATION FACILITY | DISTANCE FROM USER'S HOUSE |
|---|---|
| XXX INN | 120 km |
| YYY INN | 80 km |
| ZZZ HOTEL | 90 km |

FIG.3B
FOUND COMBINATIONS

| | ACCOMMODATION FACILITY | REGION | DISTANCE BETWEEN EITHER ONE AND USER'S HOUSE | DISTANCE BETWEEN ACCOMMODATION FACILITY AND REGION | DISTANCE FROM USER'S HOUSE |
|---|---|---|---|---|---|
| ADVANTAGEOUS | CCC INN | UCHIBO | 60 KM TO UCHIBO | 10 KM | 70 KM |
| | DDD HOTEL | IZU | 110 KM TO DDD HOTEL | 20 KM | 130 KM |
| | EEE HOTEL | NASU | 70 KM TO EEE HOTEL | 20 KM | 90 KM |

FIG.4

```
SEARCH KEYWORD
OPEN-AIR BATH, MOUNTAIN CLIMBING, CRABS, ALL-YOU-CAN-     [SEARCH]
DRINK, DIVING, FIREWORKS, BEDROCK BATH
```

1ST ITEM TO 4TH ITEM OF 4 ITEMS

110 —

XXX INN

............
..........

XXX SPECIAL DISH PROVIDING PLAN    CHARGE 15000 YEN

............
............

120 — CCC INN AND UCHIBO

121 —

CCC INN

OPEN-AIR BATH AND BEDROCK BATH ARE · · · · · ·
· · · · · · · · ·

ALL-YOU-CAN-DRINK PLAN WITH CRABS    CHARGE 10000 YEN

............
............

122 —

UCHIBO

............
..........

ABC BATHING BEACH

· · · · · · · · DIVING · · · · · · · · · · · · · · ·
FIREWORKS SHOW WILL BE HELD ON X MONTH, X DAY · · · ·

DE MOUNTAIN

............
· · · · · · · · · · VISITED BY MOUNTAINEERS · · · ·

110 —

YYY INN

MEMBER INFORMATION DB 12a

| USER ID |
| --- |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |

FIG.6B

ACCOMMODATION FACILITY INFORMATION DB 12b

| FACILITY ID |
| --- |
| ACCOMMODATION FACILITY NAME |
| REGION ID |
| POSTAL CODE |
| ADDRESS |
| PHONE NUMBER |
| FACSIMILE NUMBER |
| EMAIL ADDRESS |
| IMAGE OF ACCOMMODATION FACILITY |
| ACCOMMODATION FACILITY DETAILED INFORMATION |

FIG.6C

REGION INFORMATION DB 12c

| REGION ID |
| --- |
| LAYER NUMBER |
| REGION NAME |
| REGION DESCRIPTION |
| POSITION INFORMATION |
| IMAGE OF REGION |
| SPOT LIST OR REGION LIST |

FIG.6D

SPOT INFORMATION DB 12d

| SPOT ID |
| --- |
| SPOT NAME |
| ADDRESS |
| PHONE NUMBER |
| IMAGE OF SPOT |
| SPOT DETAILED INFORMATION |

FIG.6E

ACCOMMODATION FACILITY KEYWORD INFORMATION DB 12e

| KEYWORD |
| --- |
| PROVIDED OBJECT TYPE |

FIG.12A

FOUND ITEMS FOR SALE

| ITEM FOR SALE | SALE ITEM PRICE | DELIVERY METHOD |
|---|---|---|
| C-1 | 95000 YEN | NORMAL DELIVERY |
| C-2 | 115000 YEN | NORMAL DELIVERY |
| C-3 | 100000 YEN | NORMAL DELIVERY |

FIG.12B

FOUND COMBINATIONS

| ANY ONE OF KEYWORDS | | ITEM 1 | ITEM 2 | SALE ITEM PRICE | DELIVERY METHOD |
|---|---|---|---|---|---|
| "XXXX YEN OR LESS" | → | A-1 | B-2 | 90000 YEN | NORMAL DELIVERY |
| "NEXT DAY DELIVERY" | → | A-4 | B-4 | 120000 YEN | NEXT DAY DELIVERY |
| | | A-5 | B-5 | 105000 YEN | NORMAL DELIVERY |

FIG.15A
MEMBER INFORMATION DB 12a

| |
|---|
| USER ID |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| THE NUMBER OF HELD POINTS |

FIG.15B
CATEGORY INFORMATION DB 42b

| |
|---|
| CATEGORY ID |
| CATEGORY NAME |
| LEVEL |
| PARENT CATEGORY ID |
| CHILD CATEGORY ID LIST |

FIG.15C
SHOP INFORMATION DB 42c

| |
|---|
| SHOP ID |
| SHOP NAME |
| POSTAL CODE |
| ADDRESS |
| PHONE NUMBER |
| EMAIL ADDRESS |
| SHOP SHIPPING FEE INFORMATION |

FIG.15D
SALE ITEM INFORMATION DB 42d

| |
|---|
| SALE ITEM ID |
| SHOP ID |
| PRODUCT CODE |
| CATEGORY ID |
| SALE ITEM NAME |
| URL OF SALE ITEM IMAGE |
| SALE ITEM DESCRIPTION |
| SIZE |
| SALE ITEM PRICE |
| DELIVERY METHOD |
| SALE ITEM SHIPPING FEE INFORMATION |
| POINT PROVISION RATE |
| STOCK QUANTITY |
| EVALUATION VALUE |

FIG.15E
RELATED SALE ITEM INFORMATION DB 42e

| |
|---|
| PRODUCT CODE OF MAIN ITEM FOR SALE |
| PRODUCT CODE OF OPTIONAL ITEM |

SEARCH APPARATUS, SEARCH METHOD, SEARCH PROGRAM, AND RECORDING MEDIUM

TECHNICAL FIELD

The present invention relates to a technical field of a search apparatus and a search method which performs a search based on a plurality of keywords specified as a search condition.

BACKGROUND ART

Conventionally, search apparatus are known which perform a search based on a keyword specified by a user. Examples of objects to be searched for include a thing, an event, and information. Further, search apparatus are known which search for a tradable object such as an item for sale and a service. When a user specifies a plurality of keywords, a search apparatus generally searches for a search object that matches all the specified keywords. Then, the search apparatus provides information related to a found search object as a search result. For example, Patent Literature 1 discloses a technique of performing search by using, as a conditional expression, a logical conjunction of a plurality of keywords extracted from a text input by a user.

CITATION LIST

Patent Literature

Patent Literature 1: JP 2002-92033 A

SUMMARY OF INVENTION

Technical Problem

However, when a plurality of keywords are specified, search objects to be searched for are more limited than a case in which only one keyword is specified. Therefore, it is more probable that there is no search object commercially advantageous for the user among found search objects than the case in which only one keyword is specified. Therefore, there is a case where the user cannot help but select a search object that is not so commercially advantageous for the user from among search objects that match all the specified keywords.

The present invention is made in view of the above situation, and an object of the present invention is to provide a search apparatus, a search method, a search program, and a recording medium which can provide information of a search object commercially advantageous for the user even when the user specifies a plurality of keywords as a search condition.

Solution to Problem

In order to solve the above problem, the invention according to claim 1 is a search apparatus comprising: a dividing means that divides a plurality of keywords specified as a search condition into two child search conditions, each of the child search conditions including at least one keyword; a search means that searches for a search object matching all of the plurality of keywords specified as the search condition and searches for search objects matching all of the keywords included in a child search condition for each of the child search conditions; an extraction means that extracts combinations of search objects having a predetermined relationship to each other from among combinations of anyone of search objects found by one of the child search conditions and any one of search objects found by the other of the child search conditions; an identification means that identifies a combination more commercially advantageous for a user than the search object found by the search condition from among the combinations extracted by the extraction means; and a providing means that provides information of the combination identified by the identification means.

According to the invention, for any keyword of the plurality of keywords, there is a search object that matches the specified keyword in a plurality of search objects included in the extracted combinations. The identified combination is a combination of search objects related to each other. Further, the identified combination is a combination that is more commercially advantageous for the user than a search object that match all of the plurality of keywords specified as the search condition. Therefore, even if the user specifies a plurality of keywords as a search condition, it is possible to provide information of a combination of search objects, which are more commercially advantageous for the user than the search object that matches all of the specified keywords.

At least one of search objects included in a combination may be an object that can be traded.

A case of dividing the plurality of keywords specified as the search condition into three or more child search conditions belongs to a technical scope of the present invention. For example, it is assumed that five keywords of a, b, c, d, and e are specified. Here, the five keywords are divided into a child search condition including a and b, a child search condition including c and d, and a child search condition including e. In this case, for example, a, b, c, and d, which are part of the five keywords, are also a plurality of keywords specified as a search condition. A plurality of keywords of a, b, c, and d are divided into two child search conditions. In other words, the process of dividing a plurality of keywords into three or more child search conditions includes a process of dividing a plurality of keywords into two child search conditions.

The invention according to claim 2 is the search apparatus according to claim 1, wherein the dividing means divides the one of the child search conditions into two grandchild search conditions when the number of search objects found by using the one of the child search conditions is smaller than a predetermined number, the search means searches for search objects matching all of the keywords included in a grandchild search condition for each of the grandchild search conditions, and the extraction means extracts combinations of search objects having a predetermined relationship to each other from among combinations of any one of search objects found by using one of the grandchild search conditions, any one of search objects found by the other of the grandchild search conditions, and any one of search objects found by the other of the child search conditions.

According to the invention, even when the number of search objects found by one child search condition is smaller than a set number, the one child search condition is divided into two grandchild search conditions and a search is performed with each of the grandchild search conditions. The number of keywords included in a grandchild search condition is smaller than that of keywords included in the one child search condition, so that there is a higher probability of finding search objects when performing a search by using the grandchild search condition than when performing a search by using the child search condition. Therefore, it is possible to more easily obtain a search result desired by the user.

A case of dividing a child search condition into three or more grandchild conditions belongs to a technical scope of the present invention because of the same reason described in the case of dividing the plurality of keywords specified as a search condition into three or more child search conditions.

The invention according to claim 3 is the search apparatus according to claim 1 or 2, wherein the dividing means divides the one of the child search conditions into two grandchild search conditions and integrates one of the grandchild search conditions with the other of the child search conditions when the number of search objects found by the one of the child search conditions is smaller than a predetermined number, the search means searches for search objects matching all of the keywords included in the other of the grandchild search conditions and search objects matching all of the keywords included in the other of the child search conditions, and the extraction means extracts combinations of search objects having a predetermined relationship to each other from among combinations of any one of search objects found by the other of the grandchild search conditions and any one of search objects found by the other of the child search conditions.

According to the invention, when the number of search objects found by one child search condition is smaller than a set number, the one child search condition is divided into two grandchild search conditions and one of the grandchild search conditions is integrated with the other child search condition. The number of keywords included in a grandchild search condition is smaller than that of keywords included in the one child search condition, so that there is a higher probability of finding search objects when performing a search by using the grandchild search condition than when performing a search by using the child search condition. Therefore, it is possible to more easily obtain a search result desired by the user without increasing the number of search objects included in the extracted combinations.

The invention according to claim 4 is the search apparatus according to any one of claims 1 to 3, wherein the dividing means includes one keyword by which the smallest number of search objects are found among the plurality of keywords in the other of the child search conditions and includes the keywords that are not included in the other of the child search conditions in the one of the child search conditions.

According to the invention, the one child search condition is formed by removing one keyword from the specified search condition. The keyword removed from the one child search condition is a keyword by which the smallest number of search objects are found. Therefore, it is possible to make the one child search condition closer to the specified search condition as much as possible and increase the probability to be able to find search objects by the one child search condition.

The invention according to claim 5 is the search apparatus according to any one of claims 1 to 4, further comprising: a selection means that selects an attribute item whose attribute value is represented by a word included in at least one of the plurality of keywords from among a plurality of attribute items of a search object, wherein the identification means identifies the combination being given an attribute value, in the attribute item selected by the selection means, more commercially advantageous for a user than an attribute value of the search object found by the search condition.

According to the invention, a commercially advantageous combination is identified by an attribute value of an attribute item which the user probably makes much of, so that it is possible to provide information of a combination which the user probably desires more than the search object that matches all of the specified keywords.

The invention according to claim 6 is a search method performed by a search apparatus, the search method comprising: a dividing step of dividing a plurality of keywords specified as a search condition into two child search conditions, each of the child search conditions including at least one keyword; a search step of searching for a search object matching all of the plurality of keywords specified as the search condition and searches for search objects matching all of the keywords included in a child search condition for each of the child search conditions; an extraction step of extracting combinations of search objects having a predetermined relationship to each other from among combinations of anyone of search objects found by one of the child search conditions and any one of search objects found by the other of the child search conditions; an identification step of identifying a combination more commercially advantageous for a user than the search object found by the search condition from among the combinations extracted in the extraction step; and a providing step that provides information of the combination identified in the identification step.

The invention according to claim 7 is a search program that causes a computer included in a search apparatus to function as: a dividing means that divides a plurality of keywords specified as a search condition into two child search conditions, each of the child search conditions including at least one keyword; a search means that searches for a search object matching all of the plurality of keywords specified as the search condition and searches for search objects matching all of the keywords included in a child search condition for each of the child search conditions; an extraction means that extracts combinations of search objects having a predetermined relationship to each other from among combinations of any one of search objects found by one of the child search conditions and any one of search objects found by the other of the child search conditions; an identification means that identifies a combination more commercially advantageous for a user than the search object found by the search condition from among the combinations extracted by the extraction means; and a providing means that provides information of the combination identified by the identification means.

The invention according to claim 8 is a recording medium in which a search program is computer-readably recorded, the search program causing a computer included in a search apparatus to function as: a dividing means that divides a plurality of keywords specified as a search condition into two child search conditions, each of the child search conditions including at least one keyword; a search means that searches for a search object matching all of the plurality of keywords specified as the search condition and searches for search objects matching all of the keywords included in a child search condition for each of the child search conditions; an extraction means that extracts combinations of search objects having a predetermined relationship to each other from among combinations of any one of search objects found by one of the child search conditions and any one of search objects found by the other of the child search conditions; an identification means that identifies a combination more commercially advantageous for a user than the search object found by the search condition from among the combinations extracted by the extraction means; and a providing means that provides information of the combination identified by the identification means.

Advantageous Effect of Invention

According to the present invention, for any keyword of the plurality of keywords, there is a search object that matches the specified keyword in a plurality of search objects included in the extracted combinations. The identified combination is a combination of search objects related to each other. Further, the identified combination is a combination that is more commercially advantageous for the user than a search object that match all of the plurality of keywords specified as the search condition. Therefore, even if the user specifies a plurality of keywords as a search condition, it is possible to provide information of a combination of search objects, which are more commercially advantageous for the user than the search object that match all of the specified keywords.

BRIEF DESCRIPTION OF DRAWINGS

FIG. 3A is a diagram showing an example of a distance from a user's house to each accommodation facility that is found independently. FIG. 3B is a diagram showing an example of a distance from a user's house to each combination that is found.

FIG. 4 is a diagram showing a display example of a search result page.

FIG. 6A is a diagram showing an example of content registered in a member information DB 12a. FIG. 6B is a diagram showing an example of content registered in an accommodation facility information DB 12b. FIG. 6C is a diagram showing an example of content registered in a regional information DB 12c. FIG. 6D is a diagram showing an example of content registered in a spot information DB 12d. FIG. 6E is a diagram showing an example of content registered in an accommodation facility keyword information DB 12e.

FIG. 12A is a diagram showing an example of a sale item price and a delivery method of each item for sale that is found independently. FIG. 12B is a diagram showing an example of a sale item price and a delivery method of each combination that is found.

FIG. 15A is a diagram showing an example of content registered in a member information DB 42a. FIG. 15B is a diagram showing an example of content registered in a category information DB 42b. FIG. 15C is a diagram showing an example of content registered in a shop information DB 42c. FIG. 15D is a diagram showing an example of content registered in a sale item information DB 42d. FIG. 15E is a diagram showing an example of content registered in a related sale item information DB 42e.

DESCRIPTION OF EMBODIMENTS

Hereinafter, embodiments of the present invention will be described in detail with reference to the drawings.

1. First Embodiment

The first embodiment described below is an embodiment where the present invention is applied to an information providing system for making a reservation for an accommodation facility.

1-1. Schematic Configuration and Function of Information Providing System

Figure 1:
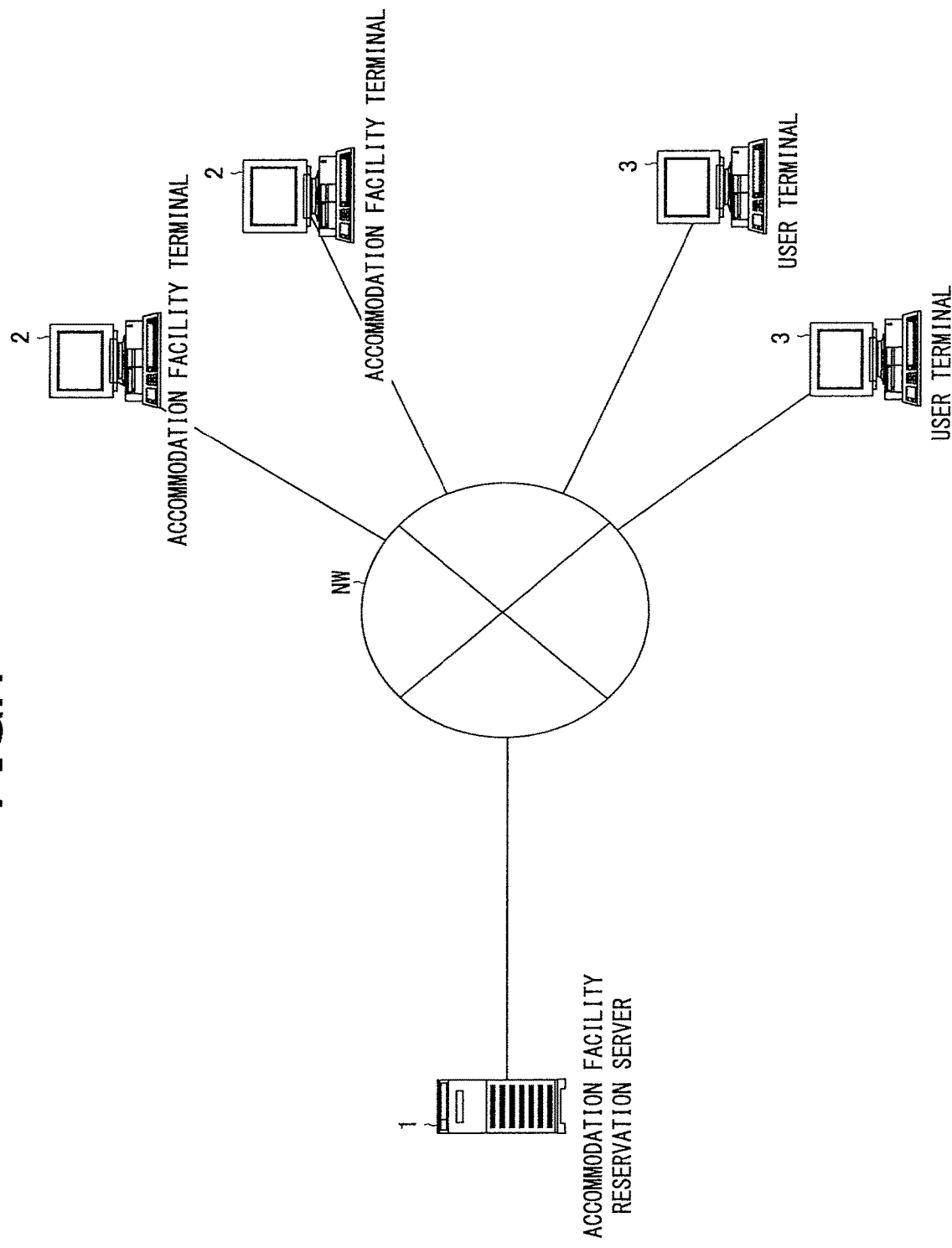
FIG. 1 is a diagram showing an example of a schematic configuration of an information providing system S1 according to an embodiment.

First, a configuration of an information providing system S1 according to the present embodiment will be described with reference to FIG. 1. FIG. 1 is a diagram showing an example of a schematic configuration of the information providing system S1 according to the present embodiment.

As shown in FIG. 1, the information providing system S1 includes an accommodation facility reservation server 1, a plurality of accommodation facility terminals 2, and a plurality of user terminals 3. The accommodation facility reservation server 1, each accommodation facility terminal 2, and each user terminal 3 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The accommodation facility reservation server 1 is a server device that performs various processes related to an accommodation facility reservation site. The accommodation facility reservation server 1 is an example of a search apparatus of the present invention. The accommodation facility reservation site is a web site that receives reservations for staying in accommodation facilities. The accommodation facility reservation site is entrusted with reservation acceptance by a plurality of accommodation facilities. For example, the accommodation facility reservation server 1 transmits a web page of the accommodation facility reservation site and performs processes related to a search for an accommodation facility and a reservation for accommodation, according to a request from the user terminal 3. The accommodation facility is an example of a search object of the present invention.

The accommodation facility terminal 2 is a terminal device used by an employee or the like of an accommodation facility that entrusts the accommodation facility reservation site with reservations. The accommodation facility terminal 2 accesses a server device such as the accommodation facility reservation server 1 on the basis of an operation from an employee or the like. Thereby, the accommodation facility terminal 2 receives a web page from the server device and displays the web page. In the accommodation facility terminal 2, software such as a browser and an email client is installed. For example, an employee registers information of the accommodation facility in the accommodation facility reservation site and checks a reservation state of the accommodation facility by using the accommodation facility terminal 2.

The user terminal 3 is a terminal device of a user who uses the accommodation facility reservation site. The user terminal 3 receives a web page from the accommodation facility reservation server 1 and displays the web page by accessing the accommodation facility reservation server 1 on the basis of an operation from the user. In the user terminal 3, software such as a browser and an email client is installed. For example, a personal computer, a PDA (Personal Digital Assistant), a mobile information terminal such as a smartphone, and a mobile phone are used as the user terminal 3.

In the accommodation facility reservation site, the user can specify a search condition to search for an accommodation facility to be used by the user. For example, it is possible to specify keywords as a search condition. For example, the user inputs as a keyword a word that concisely represents a condition of an accommodation facility desired by the user. When the search condition is specified, the accommodation facility reservation server 1 searches for accommodation facilities that satisfy the search condition. Specifically, the accommodation facility reservation server 1 searches for accommodation facilities where the specified keyword is included in a name of the accommodation facility and/or detailed information of the accommodation facility. Then, the accommodation facility reservation server 1 transmits a search result page to the user terminal 3.

The search result page is a web page on which a list of found accommodation facilities is displayed. For example, on the search result page, information such as an accommodation facility name, an image of the accommodation facility, a brief description of the accommodation facility, and an accommodation plan is displayed for each accommodation facility. The accommodation plan is, for example, an accommodation service planned by an accommodation facility. A plurality of pieces of information of accommodation plans may be displayed for one accommodation facility. Further, a hyperlink (hereinafter referred to as a "link") to an accommodation facility page of the found accommodation facility is embedded in the search result page. The accommodation facility page is a web page on which information related to one accommodation facility is displayed. There are a plurality types of web pages for each accommodation facility. For example, there are a top page of an accommodation facility, a web page on which detailed information of the accommodation facility is displayed, and a web page on which a list of accommodation plans is displayed. A user can make a reservation for an accommodation facility by performing a reservation operation on the accommodation facility page.

1-2. Providing Information of Combination of Commercially Advantageous Accommodation Facility and Region A user may have a plurality of conditions requested for an accommodation facilities which the user wants to search for. For example, the conditions include a service which the user wants to be provided from the accommodation facility, equipment which the user wants to use, a thing which the user wants to do. The service and the facility are examples of a provision object which is provided to the user in the present invention. Further, a service, equipment, and a place which realize a thing which the user wants to do are examples of the provision object in the present invention. When the user inputs a keyword related to a condition for each condition to be requested, a plurality of keywords are specified as a search condition. When a plurality of keywords are specified, the accommodation facility reservation server 1 searches for accommodation facilities that match all the specified keywords. Therefore, the greater the number of specified keywords, the smaller the number of accommodation facilities that match all the keywords or the lower the probability that there is an accommodation facility that matches all the keywords. So, there is a case in which the user cannot obtain a search result desired by the user. Specifically, the number of the accommodation facilities that will be searched for is more limited than a case in which the user specifies only one keyword. Therefore, a probability that there is no accommodation facility that is commercially advantageous for the user among found accommodation facilities increases. The search result desired by the user is a search result including an accommodation facility that is commercially advantageous for the user. When there is no accommodation facility that is commercially advantageous for the user, the user cannot help but select an accommodation facility that is not so commercially advantageous for the user or an accommodation facility that is commercially disadvantageous for the user. For example, selecting an accommodation facility includes causing an accommodation facility page to be displayed and making a reservation.

For example, whether or not to be commercially advantageous is determined based on an attribute of an accommodation facility. Each accommodation facility has a plurality of attributes. Examples of attribute items of an accommodation facility include an accommodation facility name, an accommodation charge, and an address. Each attribute of an accommodation facility has some attribute value corresponding to the attribute item. The attribute value is information representing content of the attribute. Examples of attribute items of an accommodation facility, which are used to determine whether the accommodation facility is advantageous or disadvantageous for the user, include a distance from a user's house and an accommodation charge. The shorter the distance from the user's house, the more advantageous for the user. The lower the accommodation charge, the more advantageous for the user. An attribute item used to determine whether the accommodation facility is commercially advantageous or disadvantageous for the user is referred to as an "advantage determination item".

The user can reduce the number of specified keywords and request the accommodation facility reservation server 1 to perform the search again in order to avoid selection of accommodation facilities that is not commercially advantageous. In other words, the user specifies a search condition again by excluding some keywords from a plurality of keywords specified first. Or, it can be considered that the accommodation facility reservation server 1 automatically reduces the keywords and performs the search again. However, in this case, the search condition specified first and the newly specified condition are not the same. Therefore, there is a case in which the user cannot obtain a desired result. There is a high probability that an accommodation facility that satisfies all conditions desired first by the user is not included in the accommodation facilities found by the new search condition.

Therefore, the accommodation facility reservation server 1 searches for a accommodation facility that matches all the keywords specified by the user and also searches for combinations that match all the keywords specified by the user on condition that an accommodation facility and a region are combined. Then, the accommodation facility reservation server 1 causes the user terminal 3 to present a combination, among found combinations, that is more commercially advantageous for the user than the accommodation facility that is found independently to the user as a search result. Thereby, the user can select a commercially advantageous accommodation facility as an accommodation facility included in a combination of the accommodation facility and a region. The accommodation facility that is found independently is accommodation facility that match all the keywords specified by the user.

When searching for combinations of an accommodation facility and a region, the accommodation facility reservation server 1 divides a plurality of keywords specified as a search condition into two search conditions, each of which includes at least one keyword. One of the two search conditions is an accommodation facility search condition. The accommodation facility search condition is a search condition that is used to search for accommodation facilities. The other condition of the two search conditions is a region search condition. The region search condition is a search condition that is not used to search for accommodation facilities. Instead, the region search condition is used to search for regions. Each of the accommodation facility search condition and the region search condition is an example of a child search condition in the present invention. The accommodation facility reservation server 1 searches for accommodation facilities that satisfy the accommodation facility search condition and searches for regions that satisfy the region search condition. Then, the accommodation facility reservation server 1 extracts combinations of an accommodation facility and a region that are related to each other from among combinations of any one of found accommodation facilities and any one of found regions. Here, the accommodation facility reservation server 1 determines that an accommodation facility and a region are related to each other if a position at which the accommodation facility is located is within a predetermined range with respect to the region. The region is an example of the search object of the present invention.

If there is an object represented by a certain keyword or a spot that provides an object related to the keyword near an accommodation facility, it can be considered that the accommodation facility need not be able to provide the object. This is because the user can satisfy a request of the user by going to the spot when using the accommodation facility. Each region has a spot that may satisfy a request of the user. Therefore, a combination of an accommodation facility and a region, in which the accommodation facility satisfies an accommodation facility search condition including a part of a plurality of keywords specified by the user and the region satisfies a region search condition including the other keywords, satisfies the request of the user as a whole.

Figure 2A:
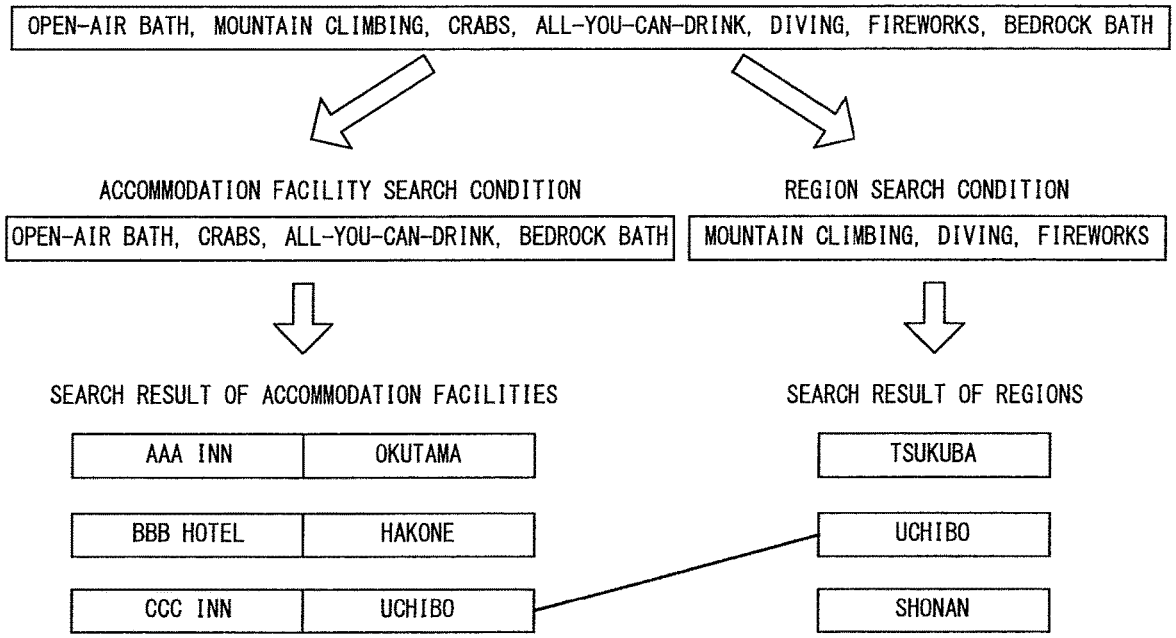
FIG. 2A is a diagram showing a search example of a combination of an accommodation facility and a region.

FIG. 2A is a diagram showing a search example of a combination of an accommodation facility and a region. The accommodation facility reservation server 1 divides a plurality of keywords specified by the user into the accommodation facility search condition and the region search condition. A criterion of the division is, for example, whether or not a keyword is related to an object that can be provided by an accommodation facility. In other words, the accommodation facility reservation server 1 classifies a plurality of keywords into keywords related to an object that is provided by an accommodation facility and keywords related to an object that is not provided by an accommodation facility.

For example, it is assumed that the user wants to use an open-air bath and a bedrock bath and wants to enjoy mountain climbing, diving, and fireworks. Further, it is assumed that the user wants to eat crabs and wants to have a meal with all-you-can-drink. Therefore, as shown in FIG. 2A, the user specifies "open-air bath, mountain climbing, crabs, all-you-can-drink, diving, fireworks, bedrock bath" as a plurality of keywords. Each group of words separated by commas is a keyword. Then, the plurality of keywords are divided into the accommodation facility search condition including "open-air bath, crabs, all-you-can-drink, bedrock bath" and the region search condition including "mountain climbing, diving, fireworks". The objects represented by the keywords included in the "open-air bath, crabs, all-you-can-drink, bedrock bath" are objects that can be provided by an accommodation facility. On the other hand, the objects represented by the keywords included in the "mountain climbing, diving, fireworks" are objects that are not generally provided by an accommodation facility.

Next, the accommodation facility reservation server 1 searches for accommodation facilities that match all the keywords included in the accommodation facility search condition and searches for regions that match all the keywords included in the region search condition. A set that contains found accommodation facilities as its elements is referred to as a "corresponding accommodation facility set". A set that contains found regions as its elements is referred to as a "corresponding region set". The accommodation facility reservation server 1 extracts combinations of an accommodation facility and a region that are related to each other from the corresponding accommodation facility set and the corresponding region set.

A criterion whether or not an accommodation facility and a region are related to each other is whether or not a position at which an accommodation facility A is located is within a predetermined range with respect to a region B. For example, the range is defined as a range in which the user can go to the region B from the accommodation facility A while traveling at a traveling destination. For example, the accommodation facility reservation server 1 determines that a region where an accommodation facility is located is a region related to the accommodation facility. The accommodation facility reservation server 1 may extend the region related to the accommodation facility to a region adjacent to the region where the accommodation facility is located. The accommodation facility reservation server 1 may extend the region related to the accommodation facility to a region near the region where the accommodation facility is located. The accommodation facility reservation server 1 may determine that a region within a range of a predetermined distance from the position at which the accommodation facility is located is the region related to the accommodation facility.

For example, as shown in FIG. 2A, it is assumed that an AAA inn, a BBB hotel, and a CCC inn are found as accommodation facilities that match the "open-air bath, crabs, all-you-can-drink, bedrock bath". There is a probability that each of these accommodation facilities can provide an open-air bath, crabs, all-you-can-drink, and a bedrock bath. The AAA inn is located in Okutama. The BBB hotel is located in Hakone. The CCC inn is located in Uchibo. On the other hand, it is assumed that Tsukuba, Uchibo, and Shonan are found as regions that match the "mountain climbing, diving, fireworks". There is a probability that there are spots at which mountain climbing, diving, and fireworks are provided respectively in each of these regions. Okutama, Hakone, Uchibo, Tsukuba, and Shonan are regions that are not adjacent to each other. Further, it is determined that these regions are not near to each other.

In this case, the CCC inn is located in Uchibo that is one of the found regions. Therefore, as a search result, a combination of the CCC inn and Uchibo is extracted.

When combinations of an accommodation facility and a region are found, the accommodation facility reservation server 1 identifies a combination, from among the found combinations, that are more commercially advantageous for the user than accommodation facility that is found independently. Then, information related to the identified combination is provided as a search result. If a combination of an accommodation facility and a region is more commercially advantageous than an independent accommodation facility, it is worth presenting the user with the combination. This is because the user need not select an accommodation facility that is more disadvantageous than the combination by selecting the combination. In the present embodiment, a combination that is more commercially advantageous for a user than an accommodation facility that is found independently is referred to as an "advantageous combination".

Here, there is a case in which there is a plurality of accommodation facilities that are found independently, that is, there is a plurality of accommodation facilities that match all the keywords specified by the user. In this case, the degree of advantage for the user varies for each accommodation facility. At this time, it may be freely determined that what accommodation facility is criterion to determine whether or not an extracted combination is advantageous. For example, the accommodation facility reservation server 1 may identify a combination, as an advantageous combination, that is more advantageous than at least one of accommodation facilities that are found. In other words, the accommodation facility reservation server 1 may identify a combination that is more advantageous than an accommodation facility that is most commercially disadvantageous for the user. Even a most disadvantageous accommodation facility for the user may be an object whose information will be provided as a search result. Therefore, regarding a combination that is more advantageous than an accommodation facility whose information will be provided as a search result, the user may compare the combination and the most disadvantageous accommodation facility for the user and select the combination. Therefore, it is worth presenting the user with a combination that satisfies such a requirement. The accommodation facility reservation server 1 may identify only combinations, as advantageous combinations, that are more advantageous than all the found accommodation facilities. In other words, the accommodation facility reservation server 1 may identify combinations that are more advantageous than an accommodation facility that is most commercially advantageous for the user among the found accommodation facilities. The accommodation facility reservation server 1 may rank the found accommodation facilities based on the degree of advantage for the user. For example, the accommodation facility reservation server 1 may calculate an average of the degrees of advantage of accommodation facilities from the first place to a predetermined place and identify a combination that is more advantageous for the user than the average as an advantageous combination. In any case, it is a minimum requirement for an advantageous combination to be more advantageous than at least one of the found accommodation facilities.

FIG. 3 is a diagram showing an identification example of a combination when using a distance from a user's house as an advantage determination item. In the case of an accommodation facility that is found independently, the distance from the user's house is a distance between the user's house and the accommodation facility. In the case of a combination of an accommodation facility and a region, the distance from the user's house is a sum of a distance between one of the accommodation facility and the region and the user's house and a distance between the accommodation facility and the region. The one of the accommodation facility and the region is one whose distance from the user's house is shorter than that of the other. The shorter the distance from the user's house, the shorter the traveling time or the easier the traveling when the user travels after making a reservation. Therefore, the shorter the distance from the user's house, the more commercially advantageous for the user.

FIG. 3A is a diagram showing an example of a distance from a user's house to each accommodation facility that is found independently. As shown in FIG. 3A, an XXX inn, a YYY inn, and a ZZZ hotel are found independently. The distances from the user's house to these accommodation facilities are 120 km, 80 km, and 90 km, respectively. FIG. 3B is a diagram showing an example of a distance from a user's house to each combination that is found. As shown in FIG. 3B, a CCC inn and Uchibo, a DDD hotel and Izu, and EEE hotel and Nasu are found as combinations, respectively. The distances from the user's house to these combinations are 70 km, 130 km, and 90 km, respectively.

When identifying only combinations that are more advantageous than an accommodation facility that is most advantageous for the user among the found accommodation facilities, a distance used as the criterion is 80 km of the YYY inn. A combination where the distance from the user's house is shorter than 80 km is only the combination of the CCC inn and Uchibo where the distance is 70 km. Therefore, this combination is identified as the advantageous combination.

Here, in the combination of the EEE hotel and Nasu, the distance between the EEE hotel and the user's house is 60 km. Therefore, the EEE hotel itself is more advantageous for the user than the YYY inn. However, the distance between the EEE hotel and Nasu is 20 km, so that a total distance exceeds 80 km. Therefore, the combination of the EEE hotel and Nasu is not identified as the advantageous combination. When identifying combinations that are more advantageous than an accommodation facility that is most disadvantageous for the user among the found accommodation facilities, the distance used as the criterion is 120 km of the XXX inn. In this case, the CCC inn and Uchibo, and the EEE hotel and Nasu are identified as the advantageous combinations.

The accommodation facility reservation server 1 may use information other than the distance from the user's house as the advantage determination item. For example, the accommodation facility reservation server 1 may use a cost necessary for use. In this case, an accommodation charge of an accommodation facility is used as a cost of an accommodation facility that is found independently. On the other hand, as a cost of a combination, a sum of an accommodation charge of an accommodation facility included in the combination and a usage charge of a spot in a region included in the combination is used. The accommodation charge used here is, for example, an accommodation charge of an accommodation plan that matches keywords specified by the user. The usage charge of a spot to be used is, for example, a usage charge of a spot that matches keywords specified by the user. When different keywords included in the region search condition match different spots respectively, a sum of the usage charges of the spots is used.

In addition to the accommodation charge and the usage charge, a travel cost may be included in the cost necessary for use. In the case of an accommodation facility that is found independently, the travel cost from the user's house to the accommodation facility is included. In the case of a combination, the travel cost from the user's house to one of the accommodation facility and the region and the travel cost between the accommodation facility and the region are included. In other words, the travel cost necessary for the user to travel all locations included in the combination is included.

FIG. 4 is a diagram showing a display example of a search result page. When combinations more advantageous than independent accommodation facilities are found, for example, as shown in FIG. 4, a search result page is displayed. In the search result page, an accommodation facility information display area 110 and a combination display area 120 are displayed. The accommodation facility information display area 110 is displayed for each accommodation facility that is found independently. The combination display area 120 is displayed for each combination that is found. As shown in FIG. 4, the accommodation facility information display areas 110 and the combination display areas 120 may be mixed and displayed. For example, a display order of the accommodation facility information display areas 110 and the combination display areas 120 is determined on the basis of predetermined indexes. For example, there is a listing score as the index. The listing score is a value representing evaluation determined for an accommodation facility or the accommodation facility page of the accommodation facility. It is shown that the higher the listing score is, the higher the evaluation is. In the case of a combination, the listing score of the accommodation facility included in the combination is used. The display order may be determined on the basis of an attribute value of the advantage determination item. In other words, the more commercially advantageous for the user the accommodation facility or the combination is, the higher the position at which the corresponding accommodation facility information display area 110 or the corresponding combination display area 120 is displayed is.

In the accommodation facility information display area 110, information related to the accommodation facility is displayed. Specifically, in the accommodation facility information display area 110, for example, an accommodation facility name, an image of the accommodation facility, an introduction of the accommodation facility, an access method to the accommodation facility, an address of the accommodation facility, information of accommodation plan, and the like are displayed. As the information of accommodation plan, for example, a name of the accommodation plan, a part of the description of the accommodation plan, the accommodation charge, and the like are displayed. The accommodation plan for which information is displayed is, for example, an accommodation plan corresponding to a keyword specified by the user. FIG. 4 is a display example of the accommodation facility information display area 110 corresponding to the XXX inn.

In the combination display area 120, an accommodation facility information display area 121 and a region information display area 122 are displayed. FIG. 4 is a display example of the combination display area 120 corresponding to the combination of the CCC inn and Uchibo.

In the accommodation facility information display area 121, information related to an accommodation facility included in one combination is displayed. The display content of the accommodation facility information display area 121 is basically the same as that of the accommodation facility information display area 110. The accommodation facility information display area 121 shown in FIG. 4 displays that the CCC inn has facilities of an open-air bath and a bedrock bath. Further, the accommodation facility information display area 121 shown in FIG. 4 displays information of an accommodation plan in which crabs are included in a dish served as a meal and the drinks are all-you-can-drink. When the user selects an accommodation facility name, the top page of the accommodation facility is displayed on a screen. When the user selects a name of an accommodation plan, a web page of a list of accommodation plans is displayed on the screen.

In the region information display area 122, information related to a region included in one combination is displayed. Specifically, in the region information display area 122, for example, a region name, an image of the region, an introduction of the region, information of a spot located in the region, and the like are displayed. As the information of a spot, for example, a spot name, a description of the spot, and the like are displayed. Examples of the spots include a famous place, a tourist attraction, and a facility. A spot for which information is displayed is, for example, a spot corresponding to a keyword specified by the user. In the region information display area 122 shown in FIG. 4, as the information of the spot, information of a bathing beach where diving can be performed and a fireworks show is held and information of a mountain where mountain climbing can be performed are displayed. When the user selects a region name, a region information page is displayed on the screen. The region information page is a web page on which information related to one region is displayed. When the user selects a name of a spot, a spot information page is displayed on the screen. The spot information page is a web page on which information related to one spot is displayed.

In this way, in the search result page, information of accommodation facilities that match all the keywords specified by the user and combinations that match all the keywords specified by the user are displayed as a search result. In the search result page, information indicating what keywords are used to search for accommodation facilities and what keywords are used to search for regions may be displayed.

The accommodation facility reservation server 1 may transmit a search result page that displays only information of the accommodation facilities that are found independently to the user terminal 3 as a search result page that is displayed first after the search. In the search result page in this case, for example, a switching button for displaying information of the found combinations is displayed. When the user selects the switching button, the accommodation facility reservation server 1 transmits a search result page that displays the information of the found combinations to the user terminal 3. The accommodation facility reservation server 1 may transmit a search result page that displays only the information of the found combinations to the user terminal 3 as a search result page that is displayed first after the search. For example, when the accommodation facility reservation server 1 identifies only combinations, as advantageous combinations, that are more advantageous than all the accommodation facilities that are found independently, information of accommodation facilities that are more disadvantageous for the user than the advantageous combinations need not be provided. In this case, in the search result page, a switching button for displaying information of the accommodation facilities that are found independently may be displayed.

When the degree of advantage of an extracted combination is the same as that of an accommodation facility that is found independently, it is optional that information of the combination is displayed on the search result page.

By the way, even if a plurality of keywords are divided into the accommodation facility search condition and the region search condition and a search is performed, a search result desired by the user may not be obtained. Therefore, the accommodation facility reservation server 1 performs a search process so that a search result desired by the user is obtained.

As a first process for obtaining a search result desired by the user, the accommodation facility reservation server 1 determines whether or not the number of accommodation facilities found by using the accommodation facility search condition is smaller than a threshold value. When the number of the found accommodation facilities is smaller than the threshold value, the accommodation facility reservation server 1 divides the accommodation facility search condition into a search condition 1 and a search condition 2. Each of the search condition 1 and the search condition 2 includes at least one keyword. The search condition 1 and the search condition 2 are examples of a grandchild search condition of the present invention. Then, the accommodation facility reservation server 1 determines the search condition 1 to be the accommodation facility search condition and integrates the search condition 2 with the region search condition. The reason why the number of keywords for accommodation facilities is reduced and the number of keywords for regions is increased is that there is a case in which a probability that a search result desired by the user is obtained increases. Generally, there is a plurality of spots in one region. Therefore, a probability that a region including a plurality of spots that may satisfy the search condition satisfies the search condition may be higher than a probability that one accommodation facility satisfies the search condition. The reason of integrating the search conditions is not to increase search conditions. If the search conditions increase, the number of accommodation facilities or regions included in a combination that is searched for increases. It is convenient for the user if the number of accommodation facilities and regions included in a combination is small. The reason why the determination is performed by using the threshold value is that when the number of the found accommodation facilities is small, a probability that a combination of an accommodation facility and a region related to each other is extracted from among the found accommodation facilities and regions is low. The threshold value used in this case is defined as T1. T1 is an example of a predetermined number in the present invention.

Figure 2B:
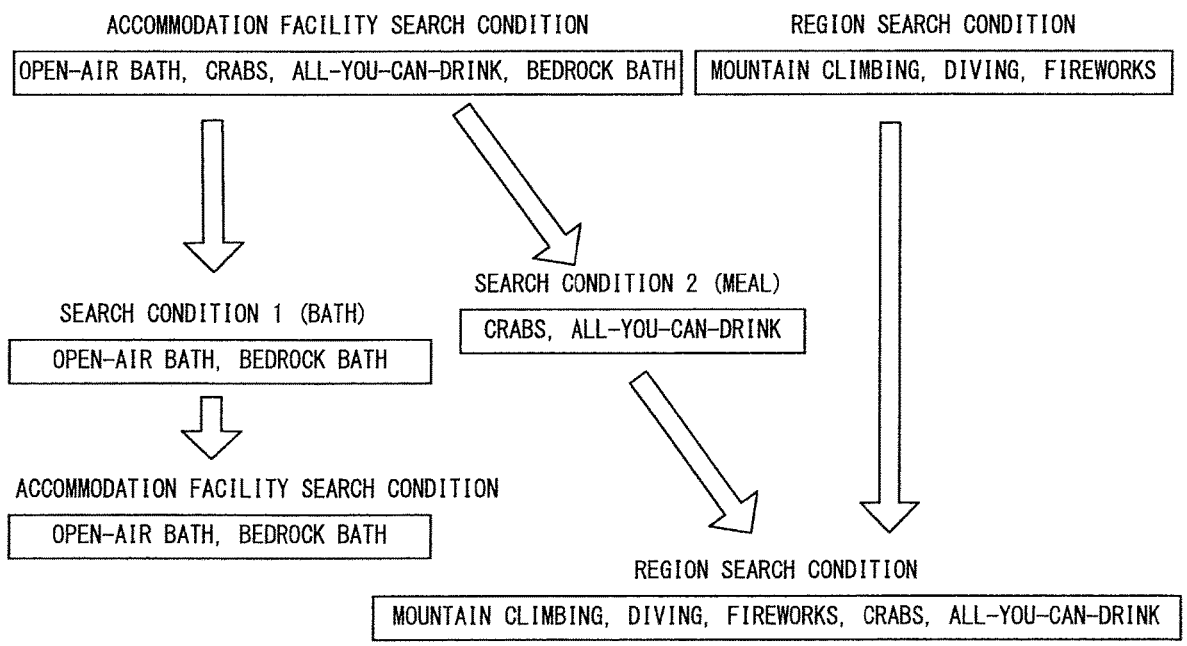
FIG. 2B is a diagram showing a change example of an accommodation facility search condition and a region search condition.

FIG. 2B is a diagram showing a change example of the accommodation facility search condition and the region search condition. The accommodation facility reservation server 1 divides the accommodation facility search condition into the search condition 1 and the search condition 2 according to types of objects related to the keywords. For example, the search condition 1 includes keywords related to a bath. For example, the search condition 2 includes keywords related to a meal. The reason why the keywords are divided by the types of objects provided to the user is that, for example, it is considered that there is an appropriate location for each type of object. Or, it is considered that if a plurality of objects belonging to the same type are provided at the same location, it is convenient for the user.

For example, as shown in FIG. 2B, "open-air bath, crabs, all-you-can-drink, bedrock bath" is divided into the search condition 1 "open-air bath, bedrock bath" and the search condition 2 "crabs, all-you-can-drink". The search condition 1 is a new accommodation facility search condition. The accommodation facility reservation server 1 searches for accommodation facilities that match all the keywords included in the new accommodation facility search condition. On the other hand, the search condition 2 is integrated with the region search condition. Then, the region search condition becomes "mountain climbing, diving, fireworks, crabs, all-you-can-drink". The accommodation facility reservation server 1 searches for regions that match all the keywords included in the new region search condition. Then, the accommodation facility reservation server 1 extracts combinations of an accommodation facility and a region that are related to each other from the accommodation facilities and the regions that are newly found.

However, the accommodation facility reservation server 1 determines whether or not the number of the accommodation facilities found by using the new accommodation facility search condition is greater than or equal to a threshold value, and only when the number of the accommodation facilities is greater than or equal to the threshold value, the accommodation facility reservation server 1 adds the search condition 2 to the region search condition. The reason why the determination is performed is the same as the reason why the determination is performed by using T1. The threshold value used in this case is defined as T2. In this case, the accommodation facility reservation server 1 uses the search condition 2 as a new accommodation facility search condition. When the number of accommodation facilities found by using the new accommodation facility search condition is greater than or equal to T2, the accommodation facility reservation server 1 integrates the search condition 1 with the region search condition. At this time, when the number of the found accommodation facilities is smaller than T2, any process can be performed. For example, the accommodation facility reservation server 1 may transmit a search result page displaying that there is no corresponding accommodation facility to the user terminal 3.

As a second process for obtaining a search result desired by the user, when the number of regions found by using the region search condition is smaller than a threshold value, the accommodation facility reservation server 1 changes a region to be searched for to a region larger than an area of a region that has been used as a region to be searched for. Then, the accommodation facility reservation server 1 searches for regions that match all the keywords included in the region search condition from among a plurality of regions that newly become regions to be searched for. The reason why the region is changed is that the larger the region is, the more the region includes spots. Therefore, the larger the region, the higher the probability that the region matches all the keywords included in the region search condition. The reason why the determination is performed by using the threshold value is because when the number of the found regions is small, a probability that a combination of an accommodation facility and a region related to each other is extracted from among the found accommodation facilities and regions is low. The threshold value used in this case is defined as T3.

In the accommodation facility reservation server 1, a set of regions to be searched is hierarchically defined. For example, a set of regions in a first layer is a set of municipalities. A set of regions in a second layer is a set of regions, each of which is formed by integrating a plurality of municipalities. In this case, each region is smaller than a prefecture. A set of regions in a third layer is a set of prefectures. The smaller the ordinal number is, the lower the layer is. The smaller the ordinal number is, the smaller an area of one region tends to be. The number of layers is optional. A criterion to define a set of regions in each layer is optional.

First, the accommodation facility reservation server 1 searches the set of regions in the first layer. The reason why the smallest regions are searched first is because the smaller the region, the higher the probability that the time taken to go from an accommodation facility to a spot combined with the accommodation facility is short. When the number of regions found at this time is smaller than T3, the accommodation facility reservation server 1 searches the set of regions in the second layer. As a result of this search, when the number of found regions is smaller than T3, the accommodation facility reservation server 1 searches the set of regions in the third layer. In this way, the accommodation facility reservation server 1 repeats the search until the number of found regions reaches T3 or more while changing regions to be searched for. When T3 or more of regions are found, the accommodation facility reservation server 1 extracts combinations of an accommodation facility and a region by using a search result at this time. When the number of found regions is smaller than T3 even if the set of regions in the highest layer is searched, any process can be performed. For example, the accommodation facility reservation server 1 may transmit a search result page displaying that there is no corresponding accommodation facility to the user terminal 3.

In the above description, T1 to T3, which are threshold values used for the determinations, are set in advance by, for example, an administrator of the accommodation facility reservation site. The administrator can set each threshold value to any value. For example, each threshold value may be set to 1. T1 and T2 are threshold values of the number of found accommodation facilities. Thus, T1 and T2 may be the same.

The accommodation facility reservation server 1 may divide a plurality of keywords specified at first by the user as a search condition into three or more search conditions. In this case, the number of the accommodation facility search conditions and the number of the region search conditions can be freely determined. When there is a plurality of accommodation facility search conditions, the accommodation facility reservation server 1 searches for accommodation facilities for each accommodation facility search condition. When there is a plurality of region search conditions, the accommodation facility reservation server 1 searches for regions for each region search condition. Then, the accommodation facility reservation server 1 extracts combinations of one or more accommodation facilities and one or more regions that are related to each other. For example, when there are two accommodation facility search conditions and one region search condition, the accommodation facility reservation server 1 extracts combinations of two accommodation facilities and one region that are related to each other from among combinations of anyone of accommodation facilities found by one accommodation facility search condition, any one of accommodation facilities found by the other accommodation facility search condition, and any one of regions found by the region search condition. The reason why a plurality of accommodation facilities may be included in a combination is that the user may use a plurality of accommodation facilities included in the combination, such as, for example, the user may use a certain accommodation facility on a first day and another accommodation facility on a second day during a travel or a business trip, and may go to a spot which satisfies a request of the user and which is located in each of regions included in the combination. The reason why a plurality of regions may be included in a combination is that the user may use accommodation facilities included in the combination during a travel or a business trip and may go to a spot which satisfies a request of the user and which is located in each of a plurality of regions included in the combination.

1-3. Configuration of Accommodation Facility Reservation Server

Next, a configuration of the accommodation facility reservation server 1 will be described with reference to FIGS. 5 and 6.

Figure 5:
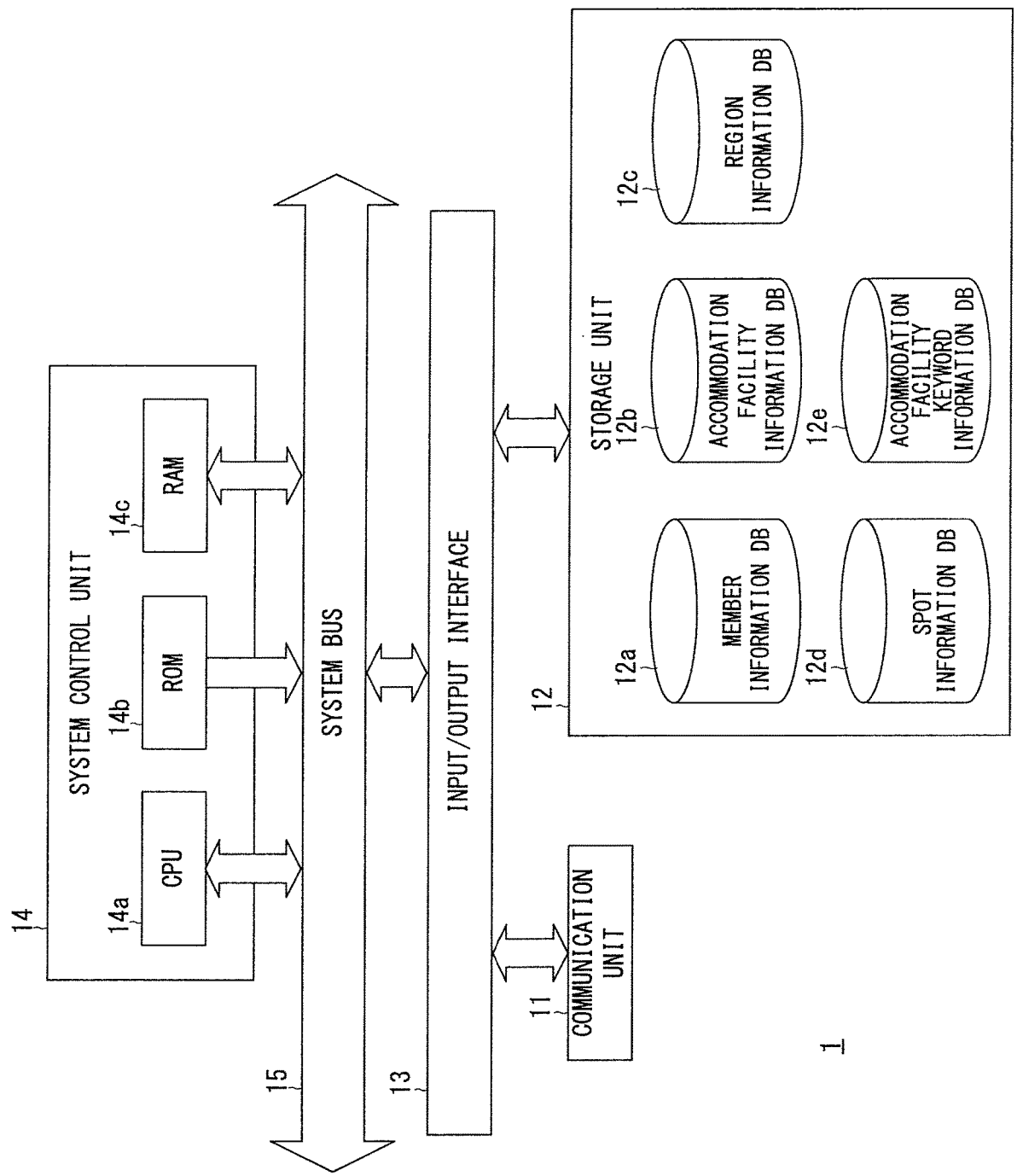
FIG. 5 is a block diagram showing an example of a schematic configuration of an accommodation facility reservation server 1 according to an embodiment.

FIG. 5 is a block diagram showing an example of a schematic configuration of the accommodation facility reservation server 1 according to the present embodiment. As shown in FIG. 5, the accommodation facility reservation server includes a communication unit 11, a storage unit 12, an input/output interface 13, and a system control unit 14. The system control unit 14 and the input/output interface 13 are connected through a system bus 15.

The communication unit 11 connects to the network NW and controls communication state with the accommodation facility terminal 2 and the user terminal 3.

The storage unit 12 includes, for example, a hard disk drive and the like. In the storage unit 12, databases such as a member information DB 12*a*, an accommodation facility information DB 12*b*, a region information DB 12*c*, a spot information DB 12*d*, and an accommodation facility keyword information DB 12*e* are constructed. The "DB" is an abbreviation of database.

FIG. 6A is a diagram showing an example of content registered in the member information DB 12*a*. In the member information DB 12*a*, member information related to users registered in the information providing system S1 as a member is registered. Specifically, in the member information DB 12*a*, user attributes such as a user ID, a password, a nickname, a name, a date of birth, a gender, a postal code, an address, a phone number, and an email address are registered in association with each other for each user. The user ID is identification information of the user.

FIG. 6B is a diagram showing an example of content registered in the accommodation facility information DB 12*b*. In the accommodation facility information DB 12*b*, accommodation facility information related to accommodation facilities is registered. Specifically, in the accommodation facility information DB 12*b*, attributes of an accommodation facility, such as a facility ID, an accommodation facility name, a region ID, a postal code, an address, a phone number, a facsimile number, an email address, an image of the accommodation facility, and accommodation facility detailed information are registered in association with each other for each accommodation facility. The facility ID is identification information of the accommodation facility. The region ID is identification information of a region in which the accommodation facility is located. The region ID that is set in the accommodation facility information is, for example, a region ID of a region in the lowest layer. The accommodation facility detailed information is character information indicating detailed information related to the accommodation facility. For example, the accommodation facility detailed information includes an introduction of the accommodation facility, equipment included in the accommodation facility, services provided in the accommodation facility, equipment and furniture in a guest room, an access method to the accommodation facility, information related to hot springs, information related to guest rooms, and the like. The accommodation facility detailed information includes information of accommodation plan. The information of accommodation plan includes a name of the accommodation plan, a detailed description of the accommodation plan, and the like.

FIG. 6C is a diagram showing an example of content registered in the region information DB 12c. In the region information DB 12c, region information related to regions is registered. Specifically, in the region information DB 12c, a region ID, a layer number, a region name, a region description, position information, an image of the region, and either one of a spot list and a region list are registered in association with each other for each region. The region ID is identification information of the region. The layer number is a number of a layer in which the region is located. The position information is, for example, the longitude and latitude of the center of the region. The spot list is registered when the layer number is 1. The spot list is a list of spots located in the region. Specifically, in the spot list, spot IDs of the spots located in the region are registered. The spot ID is identification information of the spot. The region list is registered when the layer number is greater than or equal to 2. The region list is a list of regions located in the region defined by the region information among regions located in a layer immediately below the layer indicated by the layer number. Specifically, in the region list, region IDs of the regions located in the region defined by the region information are registered. In the region information of a region located in a layer higher than the first layer, the list of spots located in the region is not defined. However, the list of regions located in the lower layer is defined. Therefore, it is possible to identify spots located in a region located in a layer higher than the first layer on the basis of the region information of regions located in a lower layer.

FIG. 6D is a diagram showing an example of content registered in the spot information DB 12d. In the spot information DB 12d, spot information related to spots is registered. Specifically, in the spot information DB 12d, attributes of a spot such as a spot ID, a spot name, an address, a phone number, an image of the spot, and spot detailed information are registered in association with each other for each spot. The spot ID is identification information of the spot. The spot detailed information is character information indicating detailed information related to the spot. For example, the spot detailed information includes a description of the spot, services provided in the spot, items for sale that can be purchased in the spot, equipment located in the spot, things which the user can do in the spot, and the like.

FIG. 6E is a diagram showing an example of content registered in the accommodation facility keyword information DB 12e. In the accommodation facility keyword information DB 12e, accommodation facility keyword information related to a keyword related to an object provided in the accommodation facility is registered. Specifically, in the accommodation facility keyword information DB 12e, a keyword, a provided object type, and the like are registered in association with each other for each keyword. The keyword is related to an object provided in the accommodation facility. The provided object type indicates a type of an object related to the keyword. Examples of the provided object type include a meal, a bath, and a guest room.

Next, other information stored in the storage unit 12 will be described. For displaying Web pages, the storage unit 12 stores various data such as HTML (HyperText Markup Language) documents, XML (Extensible Markup Language) documents, image data, text data, and electronic documents. Further, the storage unit 12 stores various setting values set by an administrator or the like. Examples of the setting values include threshold values such as T1 to T3.

Further, the storage unit 12 stores various programs such as an operating system, a WWW (World Wide Web) server program, a DBMS (Database Management System), and an accommodation facility reservation processing program. The accommodation facility reservation processing program is a program for performing processes such as a search for accommodation facilities and regions and a reservation of an accommodation facility. The accommodation facility reservation processing program is an example of a search program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as a dividing means, a search means, an extraction means, an identification means, and a providing means of the present invention.

The accommodation facility reservation server 1 may include a plurality of server devices. For example, a server device that searches for accommodation facilities and regions, a server device that performs reservation processing of an accommodation facility, a server device that transmits a web page according to a request from the user terminal 3, a server device that manages databases, and the like may be connected to each other by a LAN or the like.

1-4. Operation of Information Providing System

Next, an operation of the information providing system S1 will be described with reference to FIGS. 7 to 9. The operation described below is an operation in a case in which a distance from the user's house is used as the advantage determination item and only combinations that are more advantageous than the most advantageous accommodation facility for the user among accommodation facilities found independently are identified as advantageous combinations.

Figure 7:
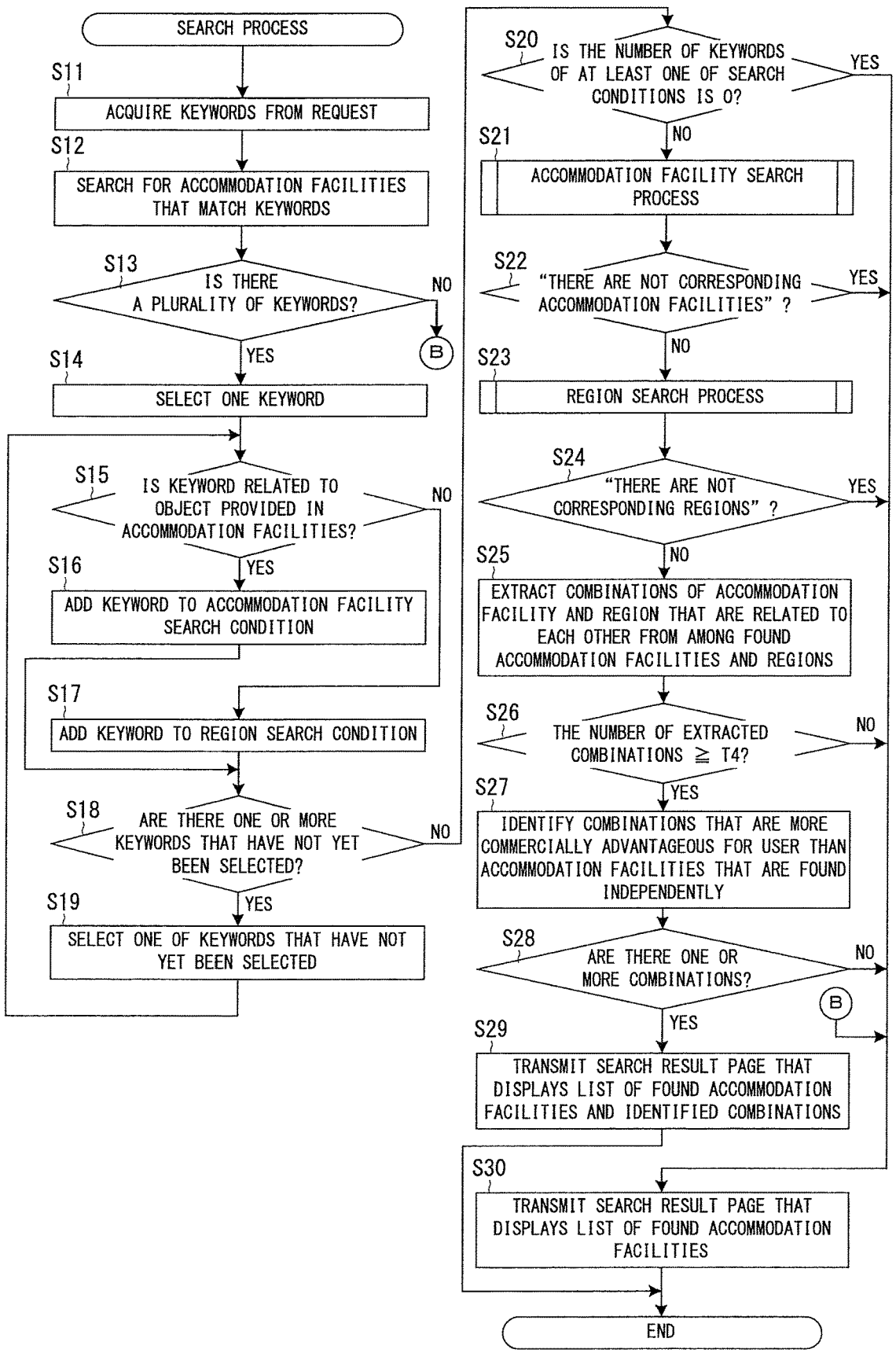
FIG. 7 is a flowchart showing a process example of a search process of a system control unit 14 of the accommodation facility reservation server 1 according to an embodiment.

FIG. 7 is a flowchart showing a process example of a search process of the system control unit 14 of the accommodation facility reservation server 1 according to the present embodiment. In the accommodation facility reservation site, the user operates the user terminal 3 and specifies one or more keywords to search for accommodation facilities. Then, the user terminal 3 transmits a search request to the accommodation facility reservation server 1. The search request includes the specified keywords. The search process is started when the accommodation facility reservation server 1 receives the search request.

As shown in FIG. 7, the system control unit 14 acquires all the specified keywords from the received search request (step S11). Next, the system control unit 14 searches for accommodation facilities that match all the specified keywords (step S12). Specifically, the system control unit 14 searches for the accommodation facility information in which at least one of the accommodation facility name and the accommodation facility detailed information includes the specified keyword from among the accommodation facility information registered in the accommodation facility information DB 12*b*. When a plurality of keywords are specified, the system control unit 14 searches for the accommodation facility information in which, for each of all the keywords, at least one of the accommodation facility name and the accommodation facility detailed information includes a keyword.

After completing the process of step S12, the system control unit 14 determines whether or not a plurality of keywords is specified (step S13). At this time, if the system control unit 14 determines that one keyword is specified (step S13: NO), the system control unit 14 transmits a search result page that displays a list of found accommodation facilities to the user terminal 3 that is the transmission source of the search request (step S30). After completing this process, the system control unit 14 ends the search process.

On the other hand, if the system control unit 14 determines that a plurality of keywords is specified (step S13: YES), the system control unit 14 selects one of the plurality of specified keywords (step S14). Next, the system control unit 14 determines whether or not the selected keyword is a keyword related to an object provided in the accommodation facilities (step S15). Specifically, the system control unit 14 searches the accommodation facility keyword information DB 12*e* for a keyword identical to the selected keyword. At this time, if a keyword identical to the selected keyword is registered in the accommodation facility keyword information DB 12*e*, the system control unit 14 determines that the selected keyword is a keyword related to an object provided in the accommodation facilities (step S15: YES). In this case, the system control unit 14 adds the selected keyword to the accommodation facility search condition (step S16). On the other hand, if a keyword identical to the selected keyword is not registered in the accommodation facility keyword information DB 12*e*, the system control unit 14 determines that the selected keyword is not a keyword related to an object provided in the accommodation facilities (step S15: NO). In this case, the system control unit 14 adds the selected keyword to the region search condition (step S17).

After completing the process of step S16 or step S17, the system control unit 14 determines whether or not there are one or more keywords that have not yet been selected among the plurality of specified keywords (step S18). At this time, if the system control unit 14 determines that there are one or more keywords that have not yet been selected (step S18: YES), the system control unit 14 selects one of the keywords that have not yet been selected (step S19). Next, the system control unit 14 proceeds to step S15. As a dividing means, the system control unit 14 divides the plurality of keywords into the accommodation facility search condition and the region search condition by repeating the processes of steps S15 to S19. If the system control unit 14 determines that all the keywords have been selected (step S18: NO), the system control unit 14 determines whether or not the number of keywords of at least one of the accommodation facility search condition and the region search condition is 0 (step S20). At this time, if the system control unit 14 determines that the number of keywords of at least one of the search conditions is 0 (step S20: YES), the system control unit 14 proceeds to step S30. In this case, the system control unit 14 may newly divide the plurality of keywords specified by the user and proceed to step S21. At this time, the system control unit 14 performs the division by, for example, a division method different from that in the processes of steps S15 to S19.

On the other hand, if the system control unit 14 determines that the number of keywords of each of the search conditions is 1 or more (step S20: NO), the system control unit 14 performs an accommodation facility search process (step S21).

Figure 8:
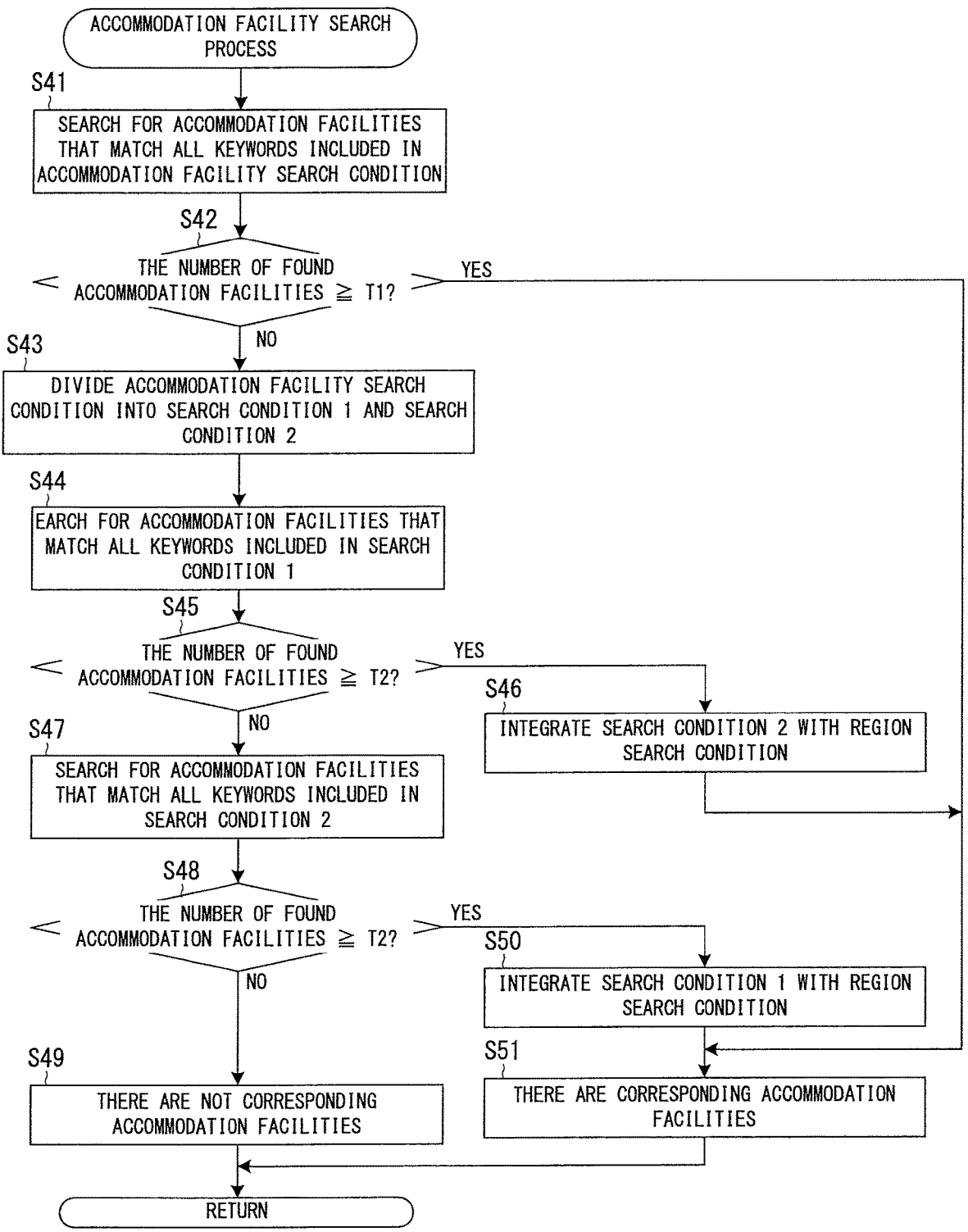
FIG. 8 is a flowchart showing a process example of an accommodation facility search process of the system control unit 14 of the accommodation facility reservation server 1 according to an embodiment.

FIG. 8 is a flowchart showing a process example of the accommodation facility search process of the system control unit 14 of the accommodation facility reservation server 1 according to the present embodiment.

As shown in FIG. 8, as a search means, the system control unit 14 searches for accommodation facilities that match all the keywords included in the accommodation facility search condition (step S41). The search method at this time is basically the same as that in step S12 in the search process. Next, the system control unit 14 determines whether or not the number of found accommodation facilities is greater than or equal to T1 (step S42). At this time, if the system control unit 14 determines that the number of found accommodation facilities is greater than or equal to T1 (step S42: YES), the system control unit 14 sets a return value to the search process to "there are corresponding accommodation facilities" (step S51). After completing this process, the system control unit 14 ends the accommodation facility search process.

On the other hand, if the system control unit 14 determines that the number of found accommodation facilities is smaller than T1 (step S42: NO), as a dividing means, the system control unit 14 divides the accommodation facility search condition into the search condition 1 and the search condition 2 (step S43). Specifically, the system control unit 14 acquires each provided object type corresponding to each keyword included in the accommodation facility search condition from the accommodation facility keyword information DB 12*e*. Next, the system control unit 14 classifies the keywords by the provided object types. In this way, the system control unit 14 forms groups of keywords whose provided object types are the same. Then, for example, the system control unit 14 defines one group of keywords as the search condition 1 and defines the other group of keywords as the search condition 2. Any provided object type of a group of keywords may be the search condition 1 and provided object type of a group of keywords may be the search condition 2. If the number of groups of keywords is three or more, the system control unit 14 integrates some of the groups together and makes two groups of keywords. If the number of groups of keywords is only one, for example, the system control unit 14 may randomly determine what keyword is included in what search condition.

When the system control unit 14 completes the division of the accommodation facility search condition, as a search means, the system control unit 14 searches for accommodation facilities that match all the keywords included in the search condition 1 (step S44). The search method at this time is basically the same as that in step S12 in the search process. Next, the system control unit 14 determines whether or not the number of found accommodation facilities is greater than or equal to T2 (step S45). At this time, if the system control unit 14 determines that the number of found accommodation facilities is greater than or equal to T2 (step S45: YES), the system control unit 14 integrates the search condition 2 with the region search condition (step S46). Next, the system control unit 14 proceeds to step S51.

On the other hand, if the system control unit 14 determines that the number of found accommodation facilities is smaller than T2 (step S45: NO), as a search means, the system control unit 14 searches for accommodation facilities that match all the keywords included in the search condition 2 (step S47). The search method at this time is basically the same as that in step S12 in the search process. Next, the system control unit 14 determines whether or not the number of found accommodation facilities is greater than or equal to T2 (step S48). At this time, if the system control unit 14 determines that the number of found accommodation facilities is greater than or equal to T2 (step S48: YES), the system control unit 14 integrates the search condition 1 with the region search condition (step S50). Next, the system control unit 14 proceeds to step S51.

On the other hand, if the system control unit 14 determines that the number of found accommodation facilities is smaller than T2 (step S48: NO), the system control unit 14 sets the return value to the search process to "there are not corresponding accommodation facilities" (step S49). After completing this process, the system control unit 14 ends the accommodation facility search process.

If the number of accommodation facilities found by using the search condition 1 is smaller than T2 in step S45, the system control unit 14 may further divide the search condition 1 into a search condition 1*a* and a search condition 1*b*. Then, the system control unit 14 may search for accommodation facilities that match all the keywords included in the search condition 1*a* and search for accommodation facilities that match all the keywords included in the search condition 1*b*. A criterion to divide the search condition 1 can be freely determined. For example, the system control unit 14 may divide the search condition 1 according to the provided object types or may divide the search condition 1 randomly. When the system control unit 14 divides the search condition 1 and performs search, a plurality of corresponding accommodation facility sets are generated. Therefore, when extracting combinations, the system control unit 14 extracts combinations of two accommodation facilities and one region that are related to each other from among combinations of anyone accommodation facility included in a corresponding accommodation facility set found by the search condition 1*a*, any one accommodation facility included in a corresponding accommodation facility set found by the search condition 1*b*, and any one region included in a corresponding region set found by the region search condition.

The system control unit 14 may search for accommodation facilities that match all the keywords included in the search condition 1*a* and integrate the search condition 1*b* with the search condition 2. When the number of accommodation facilities found by using the search condition 1*a* is greater than or equal to T2, the system control unit 14 may integrate the search condition 2 including the search condition 1*b* with the region search condition.

Also, when the number of accommodation facilities found by using the search condition 2 is smaller than T2 in step S48, the system control unit 14 may further divide the search condition 2. Processing content after the division is basically the same as that in the case in which the search condition 1 is divided.

After completing the accommodation facility search process, as shown in FIG. 7, the system control unit 14 determines whether or not the return value is set to "there are not corresponding accommodation facilities" (step S22). At this time, if the system control unit 14 determines that the return value is set to "there are not corresponding accommodation facilities" (step S22: YES), the system control unit 14 proceeds to step S30. On the other hand, if the system control unit 14 determines that the return value is not set to "there are not corresponding accommodation facilities" (step S22: NO), the system control unit 14 performs a region search process (step S23).

Figure 9:
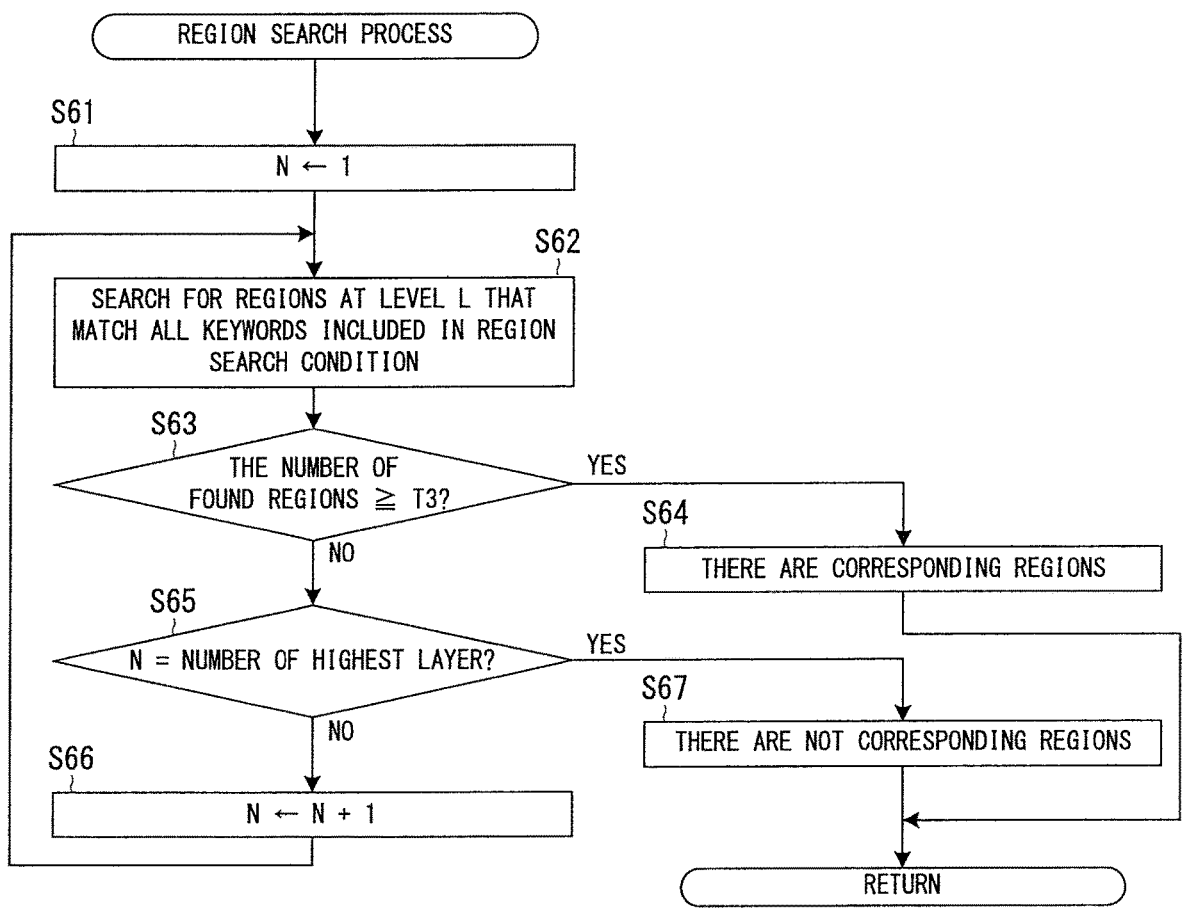
FIG. 9 is a flowchart showing a process example of a region search process of the system control unit 14 of the accommodation facility reservation server 1 according to an embodiment.

FIG. 9 is a flowchart showing a process example of the region search process of the system control unit 14 of the accommodation facility reservation server 1 according to the present embodiment.

As shown in FIG. 9, the system control unit 14 sets a layer number N to 1 (step S61). Next, as a search means, the system control unit 14 searches for regions that match all the keywords included in the region search condition from a set of regions in an Nth layer (step S62). Specifically, the system control unit 14 selects one piece of region information in which the layer number is N from the region information registered in the region information DB 12*c*. Next, when the selected region information includes a spot list, the system control unit 14 acquires spot information corresponding to each spot ID registered in the spot list from the spot information DB 12*d*. The layer number N is 1 at this time, so that the region information includes a spot list. Next, the system control unit 14 searches for each keyword included in the region search condition, from the region name and the region description included in the selected region information and the spot name and the spot detailed information included in the acquired each piece of spot information. Here, when all the keywords included in the region search condition are found, the system control unit 14 acquires the region ID included in the selected region information as a region ID of a region that matches all the keywords included in the region search condition. The system control unit 14 performs such processing for all pieces of region information in which the layer number is N.

After completing the process of step S62, the system control unit 14 determines whether or not the number of found regions is greater than or equal to T3 (step S63). At this time, if the system control unit 14 determines that the number of found regions is greater than or equal to T3 (step S63: YES), the system control unit 14 sets a return value to the search process to "there are corresponding regions" (step S64). After completing this process, the system control unit 14 ends the region search process.

On the other hand, if the system control unit 14 determines that the number of found regions is smaller than T3 (step S63: NO), the system control unit 14 determines whether or not the layer number N is the same as the number of the highest layer (step S65). At this time, if the system control unit 14 determines that the layer number N is not the same as the number of the highest layer (step S65: NO), the system control unit 14 adds 1 to the layer number N (step S66). Thereby, the system control unit 14 makes the size of regions to be searched for larger than that used when the previous search is performed in step S62. Next, the system control unit 14 proceeds to step S62.

The system control unit 14 repeats the search for regions while gradually changing the size of regions to be searched for to be larger until the number of found regions becomes greater than or equal to T3 by repeating the processes of steps S62 to S66. Here, in step S62, when the layer number N is greater than or equal to 2, no spot list is included in the region information to be searched for. In this case, the system control unit 14 acquires region information corresponding to each region ID registered in the region list included in the region information from the region information DB 12*c*. Next, the system control unit 14 determines whether or not a spot list is included in the acquired region information. At this time, if no spot list is included in the acquired region information, the system control unit 14 further acquires region information corresponding to each region ID registered in the region list included in the acquired region information. The system control unit 14 repeats the acquisition of region information until the system control unit 14 acquires region information including a spot list. Then, the system control unit 14 acquires spot information based on the spot list included in the acquired region information. The system control unit 14 searches for keywords by using the acquired spot information.

In step S65, if the system control unit 14 determines that the layer number N is the same as the number of the highest layer (step S65: YES), the system control unit 14 sets the return value to "there are not corresponding regions" (step S67). This is because there are not regions to be searched for. After completing this process, the system control unit 14 ends the region search process.

When the system control unit 14 determines that the layer number N is the same as the number of the highest layer, the system control unit 14 may divide the region search condition into a region search condition 1 and a region search condition 2. Then, the system control unit 14 may search for regions that match all the keywords included in the region search condition 1 and search for regions that match all the keywords included in the region search condition 2. A criterion to divide the region search condition can be freely determined. For example, the system control unit 14 may divide the region search condition according to a type of object related to a keyword. When the system control unit 14 divides the region search condition and performs search, a plurality of corresponding region sets are generated. Therefore, when extracting combinations, the system control unit 14 extracts combinations of one accommodation facility and two regions that are related to each other from among combinations of any one accommodation facility included in a corresponding accommodation facility set found by the accommodation facility search condition, any one region included in a corresponding region set found by the region search condition 1, and any one region included in a corresponding region set found by the region search condition 2.

After completing the region search process, as shown in FIG. 7, the system control unit 14 determines whether or not the return value is set to "there are not corresponding regions" (step S24). At this time, if the system control unit 14 determines that the return value is set to "there are not corresponding regions" (step S24: YES), the system control unit 14 proceeds to step S30.

On the other hand, if the system control unit 14 determines that the return value is not set to "there are not corresponding regions" (step S24: NO), as an extraction means, the system control unit 14 extracts combinations of an accommodation facility and a region that are related to each other from the corresponding accommodation facility set which is a set of accommodation facilities found in the accommodation facility search process and the corresponding region set which is a set of regions found in the region search process (step S25). For example, the system control unit 14 extracts combinations based on a positional relationship between a region in which a found accommodation facility is located and a found region. The region in which the found accommodation facility is located is indicated by the region ID included in the accommodation facility information. For example, for each found accommodation facility, it is determined whether or not the region in which the accommodation facility is located is the same as any one of found regions or whether or not the region in which the accommodation facility is located is included in any one of found regions. In other words, the system control unit 14 determines whether or not an accommodation facility is located in any one of regions. When an accommodation facility is located in any one of found regions, the system control unit 14 selects the accommodation facility and the region as a combination. When regions adjacent to or near a region in which an accommodation facility is located are included in regions related to the accommodation facility, for example, a database in which information indicating regions adjacent to each other or information indicating regions near each other is registered may be constructed in the storage unit 12. When an accommodation facility is located in a region adjacent to or near any one of found regions, on the basis of the database, the system control unit 14 selects the accommodation facility and the region as a combination. When the system control unit 14 extracts a combination based on a distance, the system control unit 14 acquires the longitude and latitude of a position where the accommodation facility is located based on the address of the accommodation facility. Then, the system control unit 14 calculates a distance from the position where the accommodation facility is located to the central position in the region. Then, the system control unit 14 extracts combinations of an accommodation facility where the calculated distance is smaller than or equal to a predetermined distance and a region.

After completing the process of step S25, the system control unit 14 determines whether or not the number of extracted combinations is greater than or equal to T4 (step S26). T4 is a threshold value that is set by, for example, an administrator of the accommodation facility reservation site. The administrator can set T4 to any value. For example, T4 may be set to 1. If the system control unit 14 determines that the number of extracted combinations is smaller than T4 (step S26: NO), the system control unit 14 proceeds to step S30.

When the system control unit 14 determines that the number of extracted combinations is smaller than T4, the system control unit 14 may newly divide the plurality of keywords specified by the user and proceed to step S21. In this case, the system control unit 14 divides the keywords so that combinations of keywords included respectively in the accommodation facility search condition and the region search condition are different from combinations of keywords included respectively in the accommodation facility search condition and the region search condition that are formed in the first division.

When T4 is set to a value of 2 or more, there is a case in which the combination display area 120 corresponding to extracted combinations is not displayed in the search result page due to proceeding to step S30 even though one or more combinations are extracted. Therefore, when one or more combinations are extracted, the system control unit 14 may proceed to step S27.

In step S26, if the system control unit 14 determines that the number of extracted combinations is greater than or equal to T4 (step S26: YES), as an identification means, the system control unit 14 identifies combinations that are more commercially advantageous for the user than accommodation facilities that are found independently from among the extracted combinations (step S27). Specifically, the system control unit 14 acquires an address from the member information of the user of the user terminal 3 that has transmitted the search request. The system control unit 14 acquires a user ID input by the user from the user terminal 3 when the user logs into the accommodation facility reservation site.

Therefore, the system control unit 14 can identify the member information of the user from the member information DB 12a by the user ID. Further, the system control unit 14 acquires an address from the accommodation facility information of each found accommodation facility. Next, the system control unit 14 calculates a distance from the user's house to an accommodation facility for each accommodation facility on the basis of the address of the user and the address of the accommodation facility. Next, the system control unit 14 selects the shortest distance among the calculated distances as a reference distance. Further, the system control unit 14 acquires an address from the accommodation facility information of an accommodation facility included in a combination and acquires the position information from the region information of a region included in the combination. Next, the system control unit 14 calculates a distance between the user's house and the accommodation facility, a distance between the user's house and the region, and a distance between the accommodation facility and the region on the basis of the address of the user, the address of the accommodation facility, and the position information of the region. Next, the system control unit 14 determines a shorter one of the distance between the user's house and the accommodation facility and the distance between the user's house and the region, calculates a sum of the shorter one and the distance between the accommodation facility and the region, and determines the sum to a distance from the user's house of the combination. Next, the system control unit 14 compares the distance from the user's house with the reference distance for each combination. Then, the system control unit 14 identifies combinations where the distance from the user's house is shorter than the reference distance as the advantageous combinations.

After completing the process of step S27, the system control unit 14 determines whether or not one or more combinations are identified as the advantageous combinations (step S28). At this time, if the system control unit 14 determines that no combination is identified (step S28: NO), the system control unit 14 proceeds to step S30.

On the other hand, if the system control unit 14 determines that one or more combinations are identified (step S28: YES), the system control unit 14 transmits an HTML document of a search result page that displays a list of the accommodation facilities that are found independently and the identified advantageous combinations to the user terminal 3 that is the transmission source of the search request (step S29). Specifically, the system control unit 14 generates data for displaying the accommodation facility information display area 110 based on the accommodation facility name, the accommodation facility detailed information, and the like included in the accommodation facility information of an accommodation facility that is found independently. At this time, if any one of the keywords matches an accommodation plan, the system control unit 14 generates display data so that information of the accommodation plan is displayed. Further, the system control unit 14 generates data for displaying the accommodation facility information display area 121 corresponding to an accommodation facility included in an advantageous combination in the same manner as in the case of the accommodation facility information display area 110. Further, the system control unit 14 generates data for displaying the region information display area 122 based on the region name and the region description included in the region information of a region included in the combination. At this time, if a keyword included in the region search condition matches a spot in the region, the system control unit 14 generates display data so that information of the spot is displayed. Next, the system control unit 14 generates an HTML document including the data for displaying the accommodation facility information display area 110, the data for displaying the accommodation facility information display area 121, and the data for displaying the region information display area 122. Then, the system control unit 14 transmits the generated HTML document. In this way, as a providing means, the system control unit 14 provides information of the identified combinations to the user terminal 3. After completing the process of step S29, the system control unit 14 ends the search process. For example, as shown in FIG. 4, the user terminal 3 displays the search result page based on the HTML document received from the accommodation facility reservation server 1.

As described above, according to the present embodiment, the system control unit 14 of the accommodation facility reservation server 1 divides a plurality of keywords specified as a search condition into the accommodation facility search condition and the region search condition, each of which includes at least one keyword, searches for accommodation facilities that match all the keywords included in the accommodation facility search condition and regions that match all the keywords included in the region search condition, extracts combinations of an accommodation facility and a region that have a predetermined relationship to each other from among combinations of any one of accommodation facilities found by the accommodation facility search condition and any one of regions found by the region search condition, identifies combinations that are more commercially advantageous for the user than accommodation facilities that are found by the search condition from among the extracted combinations, and provides information of the identified combinations. Therefore, even if the user specifies a plurality of keywords as a search condition, it is possible to provide information of combinations of an accommodation facility and a region, which are more commercially advantageous for the user than accommodation facilities that match all the specified keywords.

Further, when the number of accommodation facilities found by the accommodation facility search condition is smaller than T1, the system control unit 14 divides the accommodation facility search condition into the search condition 1 and the search condition 2, integrates the search condition 2 with the region search condition, searches for accommodation facilities that match all the keywords included in the search condition 1 and regions that match all the keywords included in the region search condition, and extracts combinations of an accommodation facility and a region that are related to each other from among combinations of any one of accommodation facilities found by the search condition 1 and any one of regions found by the region search condition. Therefore, it is possible to more easily obtain a sufficient number of search results desired by the user without increasing the number of accommodation facilities or regions included in the extracted combinations.

Further, the system control unit 14 determines whether or not a keyword is a keyword related to a provision object provided by an accommodation facility for each of a plurality of keywords, includes keywords determined to be related to the provision object in the accommodation facility search condition, and includes keywords determined not to be related to the provision object in the region search condition. Therefore, it is possible to obtain a sufficient number of combinations including an accommodation facility that provides a provision object desired by the user.

When a location of any one of accommodation facilities found by the accommodation facility search condition is within a predetermined range with respect to any one of regions found by the region search condition, the system control unit 14 extracts the accommodation facility and the region as a combination of an accommodation facility and a region related to each other. Therefore, it is possible to obtain a combination of an accommodation facility and a region, to both of which the user can easily go around the same time.

Further, when the number of regions found by the region search condition is smaller than T3, the system control unit 14 makes the size of regions to be searched for larger than that used when the number of found regions is smaller than T3, searches for regions that match all the keywords included in the region search condition from among the regions whose size is changed, and extracts combinations of an accommodation facility and a region that are related to each other from among combinations of any one of accommodation facilities found by the accommodation facility search condition and any one of regions that are found by the region search condition from among the regions whose size is changed. Therefore, when the number of found regions is smaller than T3, the size of regions to be searched for becomes large, so that the probability that regions that match all the keywords included in the region search condition are found increases. Therefore, it is possible to more easily obtain a sufficient number of search results desired by the user.

2. Second Embodiment

The second embodiment described below is an embodiment where the present invention is applied to an information providing system for purchasing an item for sale.

2-1. Schematic Configuration and Function of Information Providing System

Figure 10:
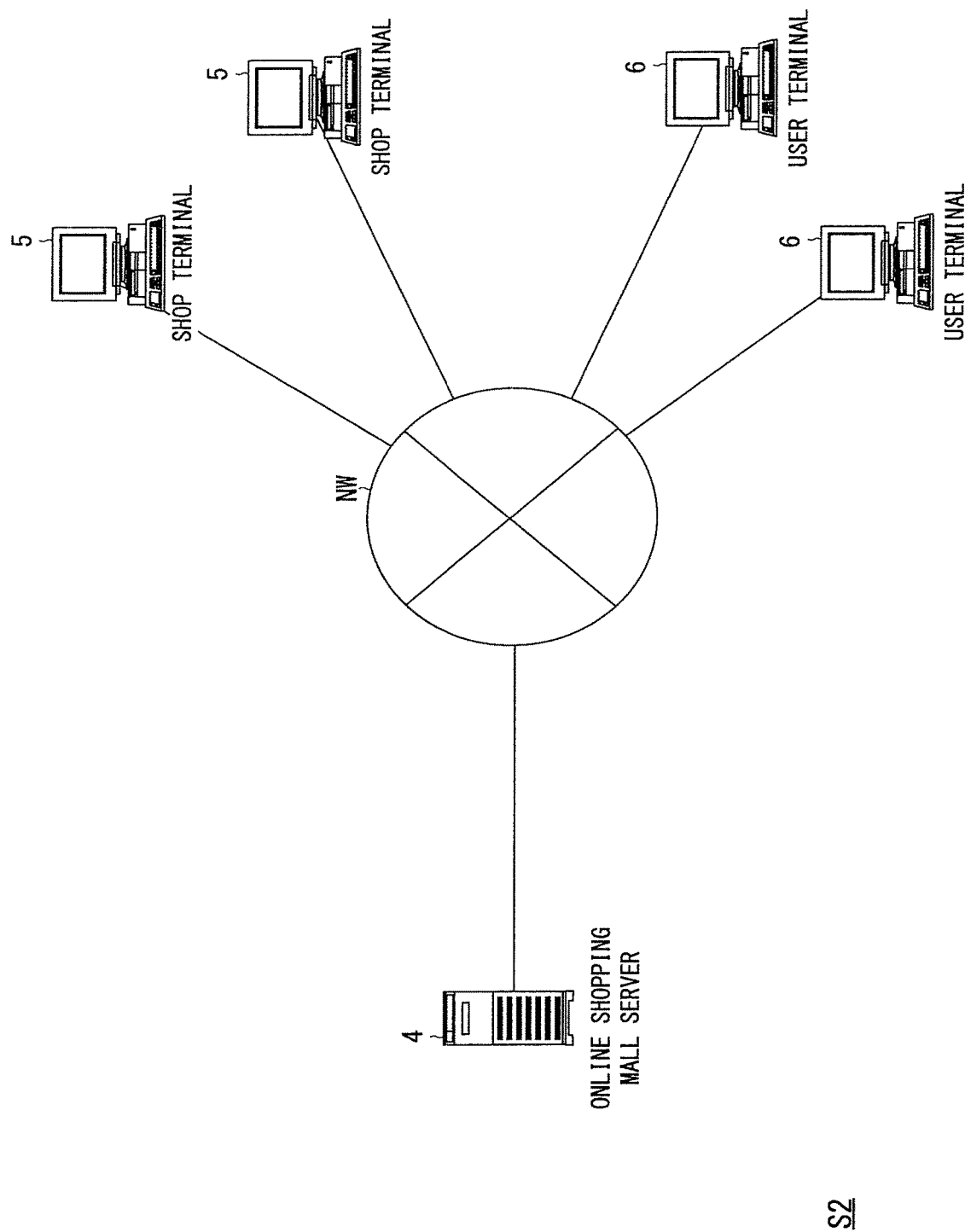
FIG. 10 is a diagram showing an example of a schematic configuration of an information providing system S2 according to an embodiment.

First, a configuration of an information providing system S2 according to the present embodiment will be described with reference to FIG. 10. FIG. 10 is a diagram showing an example of a schematic configuration of the information providing system. S2 according to the present embodiment. In FIG. 10, the same components as those in FIG. 1 are denoted by the same reference numerals.

As shown in FIG. 10, the information providing system S2 includes an online shopping mall server 4, a plurality of shop terminals 5, and a plurality of user terminals 6. The online shopping mall server 4, each shop terminal 5, and each user terminal 6 can transmit and receive data to and from each other through a network NW.

The online shopping mall server 4 is a server device that performs various processes related to an online shopping mall from which items for sale can be purchased. The online shopping mall server 4 is an example of a search apparatus of the present invention. A user can purchase a desired item for sale from a desired shop by using the online shopping mall. For example, the online shopping mall server 4 transmits a web page of the online shopping mall and performs processes related to a search and a purchase of an item for sale according to a request from the user terminal 6. The item for sale is an example of a search object of the present invention.

The shop terminal 5 is a terminal device used by an employee or the like of a shop that is open in the online shopping mall. The shop terminal 5 accesses a server device such as the online shopping mall server 4 on the basis of an operation from an employee or the like. Thereby, the shop terminal 5 receives a web page from the server device and displays the web page. In the shop terminal 5, software such as a browser and an email client is installed. For example, an employee registers information of an item for sale to be sold in the online shopping mall and checks content of order of an item for sale by using the shop terminal 5.

The user terminal 6 is a terminal device of a user who uses the online shopping mall. The configuration and function of the user terminal 6 are the same as those of the user terminal 3 in the first embodiment.

The user can specify a search condition to search for an item for sale to be a purchase candidate in the online shopping mall. For example, it is possible to specify a keyword as a search condition. For example, the user can specify a word that concisely represents a condition of an item for sale desired by the user as a keyword. When a search condition is specified, the online shopping mall server 4 searches for items for sale that satisfy the search condition. Specifically, the online shopping mall server 4 searches for items for sale where the specified keyword is included in a sale item name and/or a sale item description. Then, the online shopping mall server 4 transmits a sale item search result page to the user terminal 6.

The sale item search result page is a web page on which a list of found items for sale is displayed. For example, on the sale item search result page, a sale item name, an image of an item for sale, a sale item price, a shop name of a selling agency, and the like are displayed for each item for sale. Further, a link to a sale item page of a found item for sale is embedded in the sale item search result page. In the sale item search result page, if the user selects a link of any item for sale, a corresponding sale item page is displayed on a screen of the user terminal 6. The sale item page is a web page on which detailed information related to one item for sale is displayed. The user can purchase an item for sale whose information is displayed on the sale item page by performing an operation to order the item for sale on the sale item page.

2-2. Providing Information of Combination of Commercially Advantageous Items for Sale A user may have a plurality of conditions requested for an item for sale when the user searches for the item for sale. When a plurality of search conditions are specified, there is a case in which the user cannot obtain a search result desired by the user because of the same reason as that in the first embodiment.

Thus, the online shopping mall server 4 divides a plurality of keywords specified as a search condition into a partial search condition 1 and a partial search condition 2, each of which includes at least one keyword. The partial search condition 1 and the partial search condition 2 are examples of a child search condition of the present invention. Next, the online shopping mall server 4 searches for an item for sale that match all of a plurality of keywords specified by the user and searches for items for sale that match all the keywords included in a partial search condition for each partial search condition. A set of items for sale that are found for each partial search condition is referred to as a "corresponding sale item set". Next, the online shopping mall server 4 extracts combinations of items for sale related to each other from among combinations of any one of items for sale included in a corresponding sale item set that is found by using the partial search condition 1 and any one of items for sale included in a corresponding sale item set that is found by using the partial search condition 2. Then, the online shopping mall server 4 causes the user terminal 6 to present combinations that are more commercially advantageous for the user than the item for sale that is found independently among the extracted combinations to the user as a search result. The item for sale that is found independently is an item for sale that matches all the keywords specified by the user. In the present embodiment, a combination that is more commercially advantageous for the user than an item for sale that is found independently is referred to as an "advantageous combination".

An example of a criterion to determine a combination of items for sale as a combination of items for sale related to each other will be described. It is assumed that there is an ideal item for sale that satisfies all requests of the user. A combination of items for sale related to each other is determined by whether or not a plurality of items for sale becomes a substitute of the ideal item for sale by using the plurality of items for sale at the same time or in combination. The user can satisfy his or her request by purchasing a combination of items for sale that satisfies such a condition. Examples of a combination of items for sale related to each other include a plurality of items for sale made by the same maker, a plurality of items for sale in the same category, a plurality of items for sale sold by the same shop, and a plurality of items for sale in a relationship between a main item for sale and an optional item of the main item for sale. Examples of an optional item include consumable goods such as a replaceable toothbrush for an electric toothbrush which is a main item for sale and an accessory such as a case that houses a mobile PC for the mobile PC which is a main item for sale.

Figure 11A:
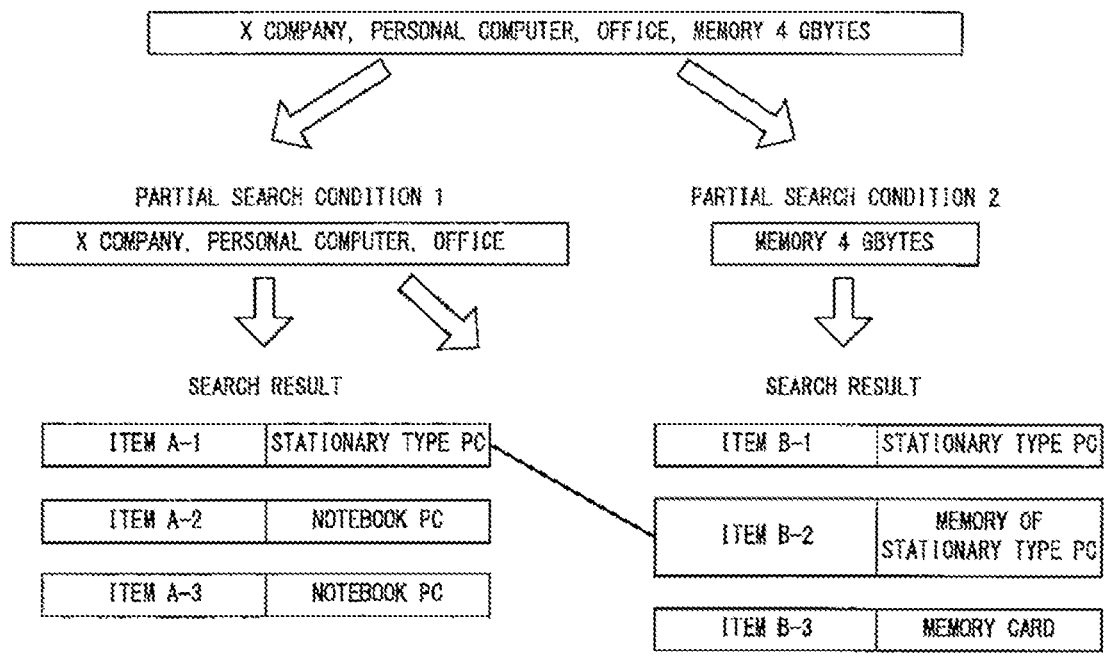
FIG. 11A is a diagram showing a search example of an item for sale.

FIG. 11A is a diagram showing a search example of an item for sale. For example, it is assumed that a user wants to purchase a personal computer. The user wants a personal computer which is made by X company, is pre-installed with office software, and has a memory capacity of 4 Gbytes. Therefore, as shown in FIG. 11A, the user specifies "X company, personal computer, office, memory 4 Gbytes" as a plurality of keywords.

A criterion to divide a plurality of keywords is optional. For example, when M keywords are specified, the online shopping mall server 4 may divide the M keywords into a partial search condition 1 including M−1 keywords and a partial search condition 2 including 1 keyword. The reason why the keywords are divided in this way is that at least one item for sale among items for sale included in a combination to be extracted is to be an item for sale that satisfies most of the requests of the user. In this case, items for sale found by using the partial search condition 1 are items for sale that satisfy most of the requests of the user. In this case, the online shopping mall server 4 may acquire the number of items for sale found by each of the M keywords and put a keyword by which the smallest number of items for sale are found into the partial search condition 2. This is because there is a probability that the keyword by which the smallest number of items for sale are found is the biggest factor for the user not to be able to obtain a desired result. It is possible to increase the probability to be able to find items for sale that satisfy the partial search condition 1 by removing the keyword that is a factor for the user not to be able to obtain a desired result from the partial search condition 1. The online shopping mall server 4 may divide a plurality of keywords by another method.

For example, it is assumed that the keyword by which the smallest number of items for sale are found is "memory 4 Gbytes". In this case, "X company, personal computer, office, memory 4 Gbytes" is divided into the partial search condition 1 "X company, personal computer, office" and the partial search condition 2 "memory 4 Gbytes".

It is assumed that items for sale, A-1, A-2, and A-3 are found as items for sale that match the "X company, personal computer, office". The item for sale A-1 is a stationary type personal computer. The items for sale A-2 and A-3 are notebook personal computers. There is a probability that the items for sale A-1, A-2, and A-3 are personal computers, made by the X company, in which the office software is pre-installed. On the other hand, it is assumed that items for sale B-1, B-2, and B-3 are found as items for sale that match the "memory 4 Gbytes". The item for sale B-1 is a stationary type personal computer. The item for sale B-2 is an additional memory for a stationary type personal computer. The item for sale B-3 is a memory card for a mobile phone. There is a probability that the memory capacity of the items for sale B-1, B-2, and B-3 is 4 Gbytes.

Here, the item for sale A-1 and the item for sale B-2 are in a relationship between a main item for sale and an optional item. Therefore, a combination of the item for sale A-1 and the item for sale B-2 is extracted as a search result. This is because a personal computer that satisfies requests of the user is made by integrating the item for sale B-2 with the item for sale A-1. On the other hand, the item for sale A-1 and the item for sale B-1 are in the same category. However, it is not possible to combine the item for sale A-1 and the item for sale B-1 together. Even if the item for sale A-1 and the item for sale B-1 can be used at the same time, it is not possible to make an item for sale that satisfies the requests of the user. Therefore, a combination of the item for sale A-1 and the item for sale B-1 is not extracted.

It is not possible to integrate the item for sale B-2 with the item for sale A-2 or the item for sale A-3. Therefore, a combination of the item for sale A-2 and the item for sale B-2 and a combination of the item for sale A-3 and the item for sale B-2 are not extracted. Although the item for sale B-3 may be connected to the items for sale A-1 to A-3, the item for sale B-3 is not an optional item of a personal computer. Therefore, a combination including the item for sale B-3 is not extracted.

A criterion to determine a combination of items for sale as a combination of items for sale related to each other may be changed according to, for example, the category of the items for sale. In the example of the personal computers described above, a plurality of items of sale in the same category do not form a combination of items for sale related to each other. However, a plurality of items of sale in the same category may form a combination of items for sale related to each other depending on the category of the items for sale. For example, it is assumed that a user wants to purchase a one-pot dish including oysters, crabs, and shrimps. Therefore, the user specifies "one-pot dish, oysters, crabs, shrimps" as a plurality of keywords. If there is no item for sale corresponding to the "one-pot dish, oysters, crabs, shrimps", the "one-pot dish, oysters, crabs, shrimps" is divided into, for example, "one-pot dish, oysters, crabs" and "shrimps". Then, a one-pot dish including oysters and crabs is found as an item for sale corresponding to the "one-pot dish, oysters, crabs" and edible shrimps are found as an item for sale corresponding to the "shrimps". It is possible to make a one-pot dish which the user wants to eat by adding shrimps to the one-pot dish including oysters and crabs. Both the one-pot dish and the shrimps are food. The online shopping mall server 4 extracts a plurality of items for sale, whose category is food, as a combination of items for sale, so that it is possible to extract a combination of items for sale that satisfy the requests of the user.

If the number of items for sale found by using the partial search condition 1 is smaller than a threshold value, the online shopping mall server 4 may further divide the partial search condition 1 into a partial search condition 1*a* and a partial search condition 1b. Next, the online shopping mall server 4 searches for items for sale that match all the keywords included in the partial search condition 1a, items for sale that match all the keywords included in the partial search condition 1b, and items for sale that match all the keywords included in the search condition 2. The online shopping mall server 4 may extract combinations of items for sale related to each other from among combinations of any one of items for sale found by using the partial search condition 1a, any one of items for sale found by using the partial search condition 1b, and any one of items for sale found by using the partial search condition 2. The threshold value used at this time is defined as T5. T5 is an example of a predetermined number in the present invention.

Figure 11B:
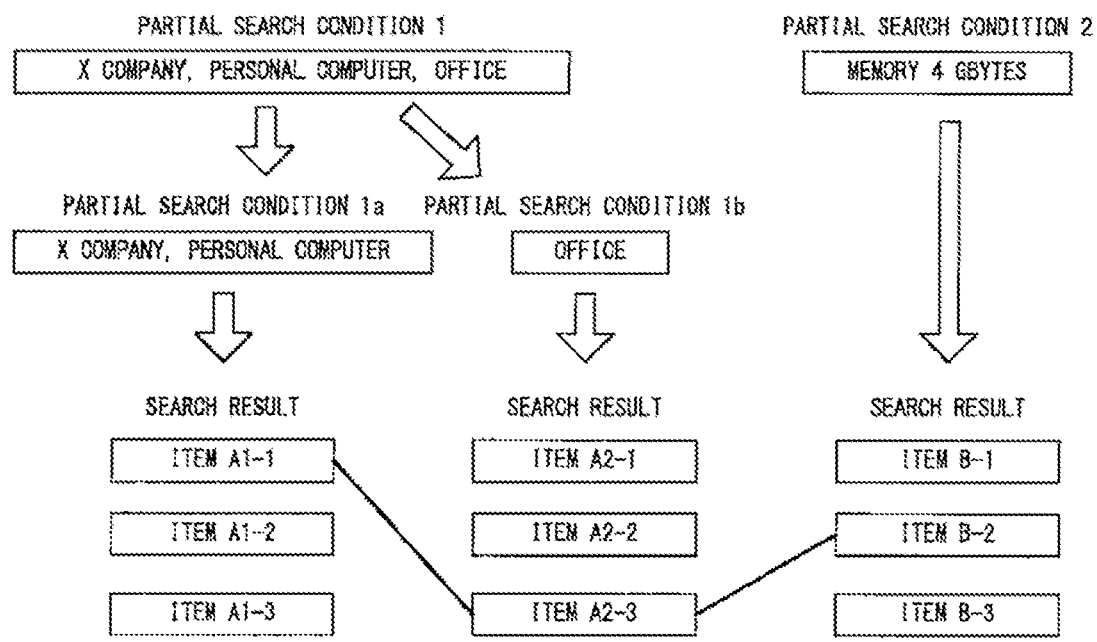
FIG. 11B is a diagram showing a division example of a partial search condition 1.

FIG. 11B is a diagram showing a division example of the partial search condition 1.

For example, among "X company", "personal computer" and "office" included in the partial search condition 1, it is assumed that the number of items for sale found by "office" is the smallest. In this case, "X company, personal computer, office" is divided into the partial search condition 1 including "X company, personal computer" and the partial search condition 2 including "office". For example, a personal computer made by the X company is found as an item for sale corresponding to the "X company, personal computer", the office software is found as an item for sale corresponding to the "office", and an additional memory for a personal computer is found as an item for sale corresponding to the "memory 4 Gbytes". Here, it is possible to install the office software in the personal computer, so that the office software can be considered as an optional item of the personal computer. The additional memory is an optional item of the personal computer. Therefore, a combination of the personal computer, the office software, and the additional memory is extracted.

The online shopping mall server 4 may divide a plurality of keywords specified at first by the user as a search condition into three or more partial search conditions. Also in this case, the online shopping mall server 4 searches for items for sale for each partial search condition. The number of items for sale included in an extracted combination is the same as the number of the partial search conditions. When the online shopping mall server 4 further divides a partial search condition, the online shopping mall server 4 may divide the partial search condition into three or more partial search conditions.

When combinations of items for sale are found, the online shopping mall server 4 identifies a combination that s more commercially advantageous for the user than an item for sale that is found independently from among the found combinations. In the same manner as in the first embodiment, when there is a plurality of items for sale that are found independently, it may be freely that what item for sale is used as a criterion to determine whether or not an extracted combination is advantageous.

Examples of the advantage determination item include a sale item price, a delivery method, a shipping fee, a point provision rate, a stock quantity, and an evaluation value. The lower the sale item price is, the more advantageous for the user the item for sale is. Examples of the delivery method include next day delivery and normal delivery. The next day delivery is a delivery method in which an item for sale is surely delivered by the next day of the day on which the item for sale is ordered. The normal delivery is a delivery method in which an item for sale is not necessarily delivered by the next day of the day on which the item for sale is ordered. The next day delivery is more advantageous for the user than the normal delivery. The lower the shipping fee, the more advantageous for the user. The point provision rate is a ratio of the number of points provided to the user when the user purchases an item for sale to the sale item price. The points can be used as money for the user purchasing an item for sale in the online shopping mall assuming that the points have the same value as money. The higher the point provision rate, the more advantageous for the user. The more the stock quantity, the more advantageous for the user. The evaluation value is a value indicating a level of evaluation of an item for sale, which is provided by the user. The user can register a review of an item for sale and provide an evaluation value. The evaluation value, which is an attribute value of an item for sale, is a value obtained by averaging the evaluation values provided by each user. The higher the evaluation value, the more advantageous for the user. A total purchase cost obtained by summing the sale item price and the shipping fee is an attribute item by which it is possible to determine whether or not an item for sale is an advantageous item for sale. The lower the total purchase cost, the more advantageous for the user. Further, an amount obtained by subtracting an amount of money according to the point provision rate from the sum of the sale item price and the shipping fee may be used as the total purchase cost. For example, if one point is used as one yen, the amount to be subtracted is an amount of money obtained by multiplying the sale item price by the point provision rate.

An attribute value of the combination is determined as described below. The sale item price is a sum of sale item prices of all items for sale included in the combination. The delivery method is the most disadvantageous delivery method for the user among the delivery methods of items for sale included in the combination. Specifically, if the delivery methods of all the items for sale are the next day delivery, the delivery method of the combination is the next day delivery. On the other hand, if the delivery methods of one or more items for sale are the normal delivery, the delivery method of the combination is the normal delivery. The shipping fee is a sum of shipping fees of all the items for sale included in the combination. However, when a plurality of items for sale are sold by the same shop, the shipping fee of the plurality of items for sale is a shipping fee in the case in which the plurality of items for sale are collectively delivered. When a plurality of items for sale that are sold by the same shop are included in the combination, the shipping fee may be lower than a value obtained by simply summing the shipping fees of all the items for sale. The point provision rate is a value obtained by dividing a sum of points obtained according to the point provision rates of items for sale included in the combination by the sale item price of the combination. The stock quantity is the smallest stock quantity among stock quantities of items for sale included in the combination. The evaluation value may be an average value of evaluation values of items for sale included in the combination or may be the highest value or the lowest value among the evaluation values of items for sale included in the combination.

The online shopping mall server 4 may use a predetermined attribute value from among a plurality of attribute items as the advantage determination item. The online shopping mall server 4 may determine the advantage determination item based on a keyword specified by the user as a search condition. The reason of this is because when the user specifies a keyword, the user may specify a keyword including a word representing an attribute value of a specific attribute item as a condition of the specific attribute item. In this case, there is a probability that the user makes much of the attribute item.

FIG. 12 is a diagram showing an example of determining an advantage determination item. FIG. 12A is a diagram showing an example of a sale item price and a delivery method of each item for sale that is found independently. As shown in FIG. 12A, items for sale C-1, C-2, and C-3 are found independently. The sale item prices of the items for sale are 95000 yen, 115000 yen, and 100000 yen, respectively. All delivery methods of each item for sale are the normal delivery. FIG. 12B is a diagram showing an example of the sale item price and the delivery method of each combination that is found. As shown in FIG. 12B, items for sale A-1 and B-2, items for sale A-4 and B-4, and items for sale A-5 and B-5 are found as combinations, respectively. The sale item prices of the combinations are 90000 yen, 120000 yen, and 105000 yen, respectively. The delivery method of the items for sale A-1 and B-2 and the items for sale A-5 and B-5 is the normal delivery. The delivery method of the items for sale A-4 and B-4 is the next day delivery.

For example, it is assumed that a keyword of "XXXX yen or less" is included. "XXXX yen" of the "XXXX yen or less" represents an amount of money. Attribute items represented by an amount of money are the sale item price and the shipping fee. However, when the user specifies a condition of the shipping fee, for example, the user specifies a keyword of "free shipping" and rarely specifies a direct amount of money. Therefore, the sale item price is determined as the advantage determination item. When identifying only combinations that are more advantageous than an item for sale that is most advantageous for the user among items for sale that are found independently, the items for sale A-1 and B-2 whose sale item price is lower than 95000 yen of the item for sale C-1 is identified.

For example, it is assumed that a keyword of "next day delivery" is included in a plurality of keywords specified by the user. The "next day delivery" represents a delivery method. Therefore, the delivery method is determined as the advantage determination item. In this case, the items for sale A-4 and B-4 are identified as the advantageous combination whose delivery method is more advantageous than any of the items of sale C-1 to C-3.

Figure 13:
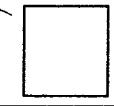
FIG. 13 is a diagram showing a display example of a sale item search result page.

FIG. 13 is a diagram showing a display example of a sale item search result page. When combinations more advantageous than independent items for sale are found, for example, as shown in FIG. 13, a sale item search result page is displayed. In the sale item search result page, a sale item information display area 210 and a combination display area 220 are displayed. The sale item display area 210 is displayed for each item for sale that is found independently. The combination display area 220 is displayed for each combination that is found. As shown in FIG. 13, the sale item information display areas 210 and the combination display areas 220 may be mixed and displayed. For example, a display order of the sale item information display areas 210 and the combination display areas 220 is determined on the basis of predetermined indexes. For example, there is a listing score as the index. The listing score is a value representing evaluation determined for an item for sale or the sale item page of the item for sale. It is shown that the higher the listing score is, the higher the evaluation is. In the case of a combination, an average value of the listing scores of items for sale included in the combination may be used as the listing score of the combination. The display order may be determined on the basis of an attribute value of the advantage determination item.

In the sale item display area 210, information related to the item for sale is displayed. Specifically, in the sale item information display area 210, for example, a sale item name, an image of the item for sale, a sale item price, a shop name of a shop that sells the item for sale, and the like are displayed. FIG. 13 is a display example of the sale item display areas 210 corresponding to each of the items for sale C-1 to C-3.

In the combination display area 220, a plurality of sale item display areas 221 are displayed. FIG. 13 is a display example of the combination display area 220 corresponding to the combination of items for sale A-1 and B-2. In the sale item display area 221, information related to an item for sale included in the combination is displayed. The sale item display area 221 is displayed for each item for sale. The display content of the sale item display area 221 is basically the same as that of the sale item display area 210.

In the same manner as in the first embodiment, the online shopping mall server 4 may transmit a search result page that displays only information of the items for sale that are found independently to the user terminal 3 as a sale item search result page that is displayed first after the search. The online shopping mall server 4 may transmit a sale item search result page that displays information of found combinations to the user terminal 3 on the basis of an operation of the user. The online shopping mall server 4 may transmit a search result page that displays only the information of the found combinations to the user terminal 3 as a search result page that is displayed first after the search.

2-3. Configuration of Online Shopping Mall Server

Next, a configuration of the online shopping mall server 4 will be described with reference to FIGS. 14 and 15.

Figure 14:
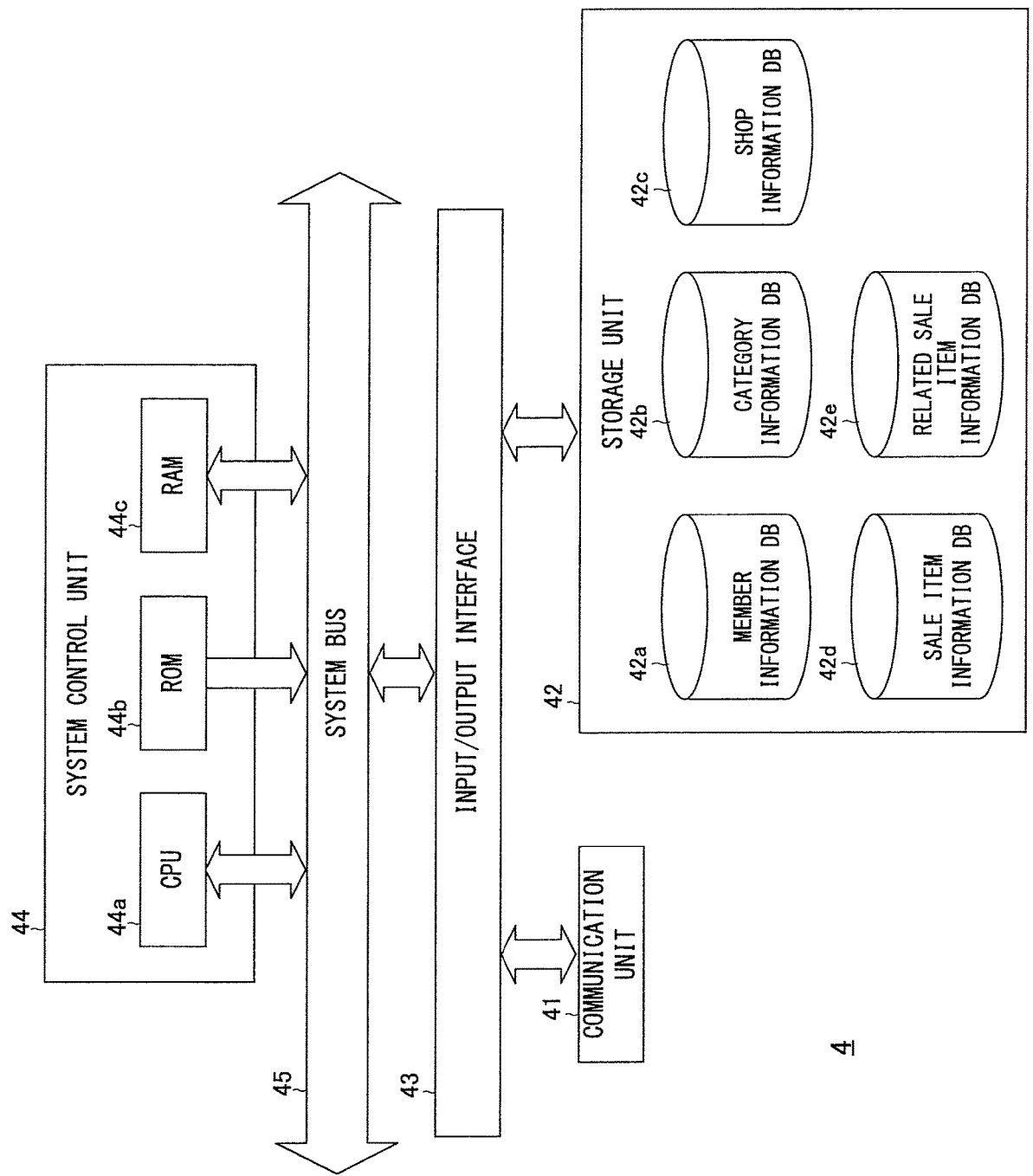
FIG. 14 is a block diagram showing an example of a schematic configuration of an online shopping mall server 4 according to an embodiment.

FIG. 14 is a block diagram showing an example of a schematic configuration of the online shopping mall server 4 according to the present embodiment. As shown in FIG. 14, the online shopping mall server 4 includes a communication unit 41, a storage unit 42, an input/output interface 43, and a system control unit 44. The system control unit 44 and the input/output interface 43 are connected through a system bus 45.

The communication unit 41 connects to the network NW and controls communication state with the shop terminal 5 and the user terminal 6.

The storage unit 42 includes, for example, a hard disk drive and the like. In the storage unit 42, databases such as a member information DB 42a, a category information DB 42b, a shop information DB 42c, a sale item information DB 42d, a related sale item information DB 42e are constructed.

FIG. 15A is a diagram showing an example of content registered in the member information DB 42a. In the member information DB 42a, member information related to users registered in the information providing system S2 as a member is registered. In the member information DB 42a, the number of held points is registered in addition to the content registered in the member information DB 12a in the first embodiment. The number of held points is the number of points held by the user.

FIG. 15B is a diagram showing an example of content registered in the category information DB 42b. In the category information DB 42b, category information related to categories of items for sale is registered. Specifically, in the category information DB 42b, attributes of a category such as a category ID, a category name, a level of the category, a parent category ID, a child category ID list are registered in association with each other for each category. For example, the category information is set by an administrator of the online shopping mall.

The categories of items for sale are hierarchically defined by a tree structure. Specifically, each node in the tree structure corresponds to a category. The depth of the node corresponds to a level (a layer) of the category corresponding to the node. The depth of the node is a distance from a node (hereinafter referred to as "root node") located at the root. The greater the value of the level, the deeper the depth of the level is. The smaller the value of the level, the shallower the depth of the level is. The category corresponding to a child node of the root node is a category of level 1. The category of level 1 is the highest category. For each category of level 1, a category corresponding to a child node is defined as the category of level 2. Here, a category C2 corresponding to a child node of a certain category C1 is referred to as a "child category" of the category C1. At this time, the category C1 is referred to as a "parent category" of the category C2. The child category is a range to which similar items for sale belong when the parent category is further divided into a plurality of categories. Therefore, the child category belongs to the parent category.

The category ID is identification information of the category defined by the category information. The parent category ID is a category ID of the parent category of the category defined by the category information. The child category ID list is a list of category IDs of child categories of the category defined by the category information. The child category ID list is set when the category defined by the category information has child categories.

FIG. 15C is a diagram showing an example of content registered in the shop information DB 42c. In the shop information DB 42c, shop information of shops that are open in the online shopping mall is registered. Specifically, in the shop information DB 42c, attributes of a shop, such as a shop ID, a shop name, a postal code, an address, a phone number, an email address, and shop shipping fee information are registered in association with each other for each shop. The shop ID is identification information of the shop. The shop shipping fee information is information indicating shipping fee rules determined by the shop. Basically, the shipping fee rule is determined for each item for sale. However, when the same shop collectively delivers a plurality of items for sale, shipping fee rules of individual items for sale cannot be used. Therefore, shipping fee rules of the entire shop are determined. In the shop shipping fee information, for example, a shipping fee is set for each prefecture to which an item for sale is transferred and each size of item for sale to be delivered.

FIG. 15D is a diagram showing an example of content registered in the sale item information DB 42d. In the sale item information DB 42d, sale item information related to items for sale sold in the online shopping mall is registered. Specifically, in the sale item information DB 42d, attributes of items for sale, such as a sale item ID, a shop ID, a product code, a category ID, a sale item name, a URL (Uniform Resource Locator) of a sale item image, a sale item description, a size, a sale item price, a delivery method, a sale item shipping fee information, a point provision rate, a stock quantity, and an evaluation value are registered in association with each other for each item for sale sold by a shop.

The sale item ID is identification information of item for sale for the shop to manage the item for sale sold by the shop. The shop ID indicates a shop which sells the item for sale. The product code is a code number to identify the item for sale. The same product code is given to the same item for sale. As an item for sale code, for example, there is JAN code (Japanese Article Number Code). Basically, the sale item ID corresponds to the sale item page on one-on-one basis. Therefore, a plurality of items for sale whose sale item information is different from each other are provided with sale item IDs different from each other even if the product codes of the items for sale are the same. The category ID is a category ID of a category to which the item for sale belongs. Basically, a category ID of a category defined at the lowest level (a category corresponding to a leaf node in the tree structure) is set. In other words, items for sale are divided into the smallest categories. The sale item name is a name of the item for sale given by the shop. Therefore, the sale item name may be different from an official name of the item for sale. The size indicates lengths of the height, the width, and the depth of the item for sale. The sale item shipping fee information is information indicating a shipping fee rule of an individual item for sale. In the sale item shipping fee information, for example, a shipping fee is set for each prefecture to which the item for sale is transferred.

FIG. 15E is a diagram showing an example of content registered in the related sale item information DB 42e. In the related sale item information DB 42e, related sale item information related to a plurality of items for sale in a relationship between a main item for sale and an optional item is registered. Specifically, in the related sale item information DB 42e, a product code of the main item for sale and a product code of the optional item are registered in association with each other for each combination of the main item for sale and the optional item.

Further, the storage unit 42 stores various data such as HTML documents, XML documents, image data, text data, and electronic documents and various setting values set by an administrator or the like.

Further, the storage unit 42 stores various programs such as an operating system, a WWW server program, a DBMS, and an electronic commerce management program. The electronic commerce management program is a program for performing processes such as searching for items for sale and ordering an item for sale. The electronic commerce management program is an example of a search program of the present invention. For example, the various programs may be acquired from another server device or the like through the network NW or may be recorded in a recording medium such as a DVD and read through a drive device.

The input/output interface 43 performs interface processing among the communication unit 41, the storage unit 42, and the system control unit 44.

The system control unit 44 includes a CPU 14a, a ROM (Read Only Memory) 44b, a RAM (Random Access Memory) 44c, and the like. In the system control unit 44, the CPU 44a reads and executes various programs, so that the system control unit 44 functions as a dividing means, a search means, an extraction means, an identification means, and a selection means of the present invention. The online shopping mall server 4 may include a plurality of server devices.

2-4. Operation of Information Providing System

Next, an operation of the information providing system S2 will be described with reference to FIG. 16. The operation described below is an operation in a case in which only combinations that are more advantageous than the most advantageous item for sale for the user among items for sale that are found independently are identified as advantageous combinations.

Figure 16:
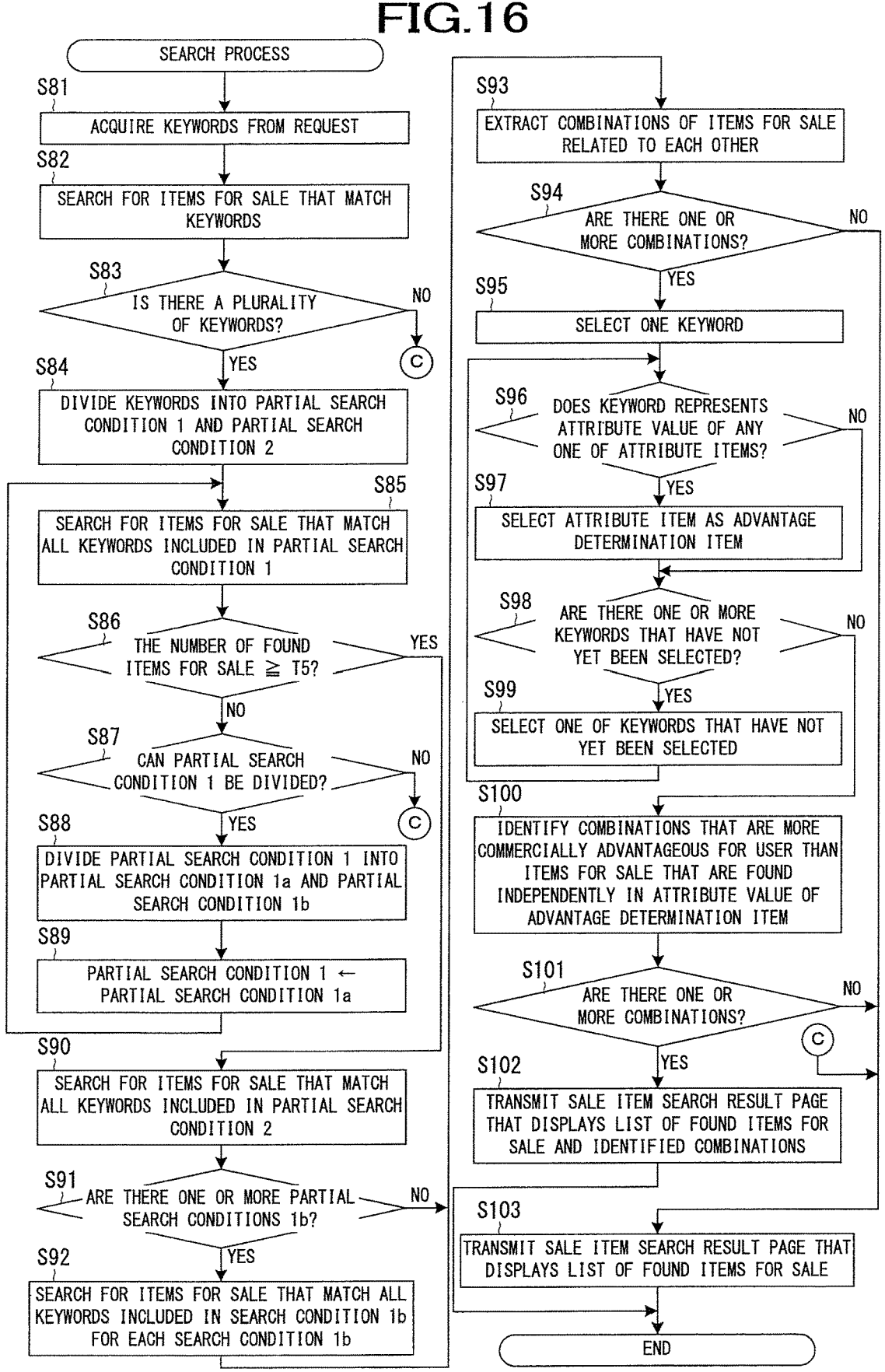
FIG. 16 is a flowchart showing a process example of a search process of a system control unit 44 of the online shopping mall server 4 according to an embodiment.

FIG. 16 is a flowchart showing a process example of the search process of the system control unit 44 of the online shopping mall server 4 according to the present embodiment. In the online shopping mall, the user operates the user terminal 6 and specifies one or more keywords. Then, the user terminal 6 transmits a search request to the online shopping mall server 4. The search request includes the specified keywords. The search process is started when the online shopping mall server 4 receives the search request.

As shown in FIG. 16, the system control unit 44 acquires all the specified keywords from the received search request (step S81). Next, the system control unit 44 searches for items for sale corresponding to all the specified keywords (step S82). Specifically, the system control unit 44 searches for the sale item information in which at least one of the sale item name and the sale item description includes the specified keyword from among the sale item information registered in the sale item information DB 42*d*. When a plurality of keywords are specified, the system control unit 44 searches for the sale item information in which, for each of all the keywords, at least one of the sale item name and the sale item description includes a keyword.

After completing the process of step S82, the system control unit 44 determines whether or not a plurality of keywords are specified (step S83). At this time, if the system control unit 44 determines that one keyword is specified (step S83: NO), the system control unit 44 transmits a sale item search result page that displays a list of found items for sale to the user terminal 6 that is the transmission source of the search request (step S103). After completing this process, the system control unit 44 ends the search process.

On the other hand, if the system control unit 44 determines that a plurality of keywords are specified (step S83: YES), as a dividing means, the system control unit 44 divides the plurality of specified keywords into a partial search condition 1 and a partial search condition 2 (step S84). Specifically, the system control unit 44 acquires the number of items for sale that are found by each of the plurality of specified keywords. At this time, the system control unit 44 may actually search for items for sale. The system control unit 44 may periodically search for items for sale by various keywords and stores the number of found items for sale in the storage unit 42 in association with the keyword. The system control unit 44 may acquire the number of found items for sale from the storage unit 42. The system control unit 44 includes one keyword by which the smallest number of items for sale are found in the partial search condition 2 and includes the other keywords in the partial search condition 1.

After completing the process of step S84, as a search means, the system control unit 44 searches for items for sale that match all the keywords included in the partial search condition 1 (step S85). The search method in this case is basically the same as that in step S82. Next, the system control unit 44 determines whether or not the number of found items for sale is greater than or equal to T5 (step S86). At this time, if the system control unit 44 determines that the number of found items for sale is smaller than T5 (step S86: NO), the system control unit 44 determines whether or not the partial search condition 1 can be further divided (step S87). For example, it may be determined that the partial search condition 1 can be divided until the number of keywords included in the partial search condition 1 becomes a predetermined number. Or, for example, it may be determined that the maximum number of times the partial search condition 1 can be divided is set in advance and the partial search condition 1 can be divided until the number of times reaches the maximum number of times. If the system control unit 44 determines that the partial search condition 1 can be further divided (step S87: YES), as a dividing means, the system control unit 44 divides the partial search condition 1 into a partial search condition 1*a* and a partial search condition 1*b* (step S88). At this time, the system control unit 44 includes one keyword by which the smallest number of items for sale are found among the keywords included in the partial search condition 1*b* and includes the other keywords in the partial search condition 1*a*. After dividing the partial search condition 1, the system control unit 44 defines the partial search condition 1*a* as the latest partial search condition 1 (step S89). Next, the system control unit 44 proceeds to step S85 and searches for items for sale corresponding to all the keywords included in the latest partial search condition 1.

The system control unit 44 repeats the search using the partial search condition 1 and the division of the partial search condition 1 until T5 or more items for sale are found or the division becomes impossible by repeating the processes of steps S85 to S89. In step S87, if the system control unit 44 determines that the partial search condition 1 cannot be further divided (step S87: NO), the system control unit 44 proceeds to step S103. In this case, the system control unit 44 may newly search for a plurality of keywords and proceed to step S85. In this case, the system control unit 44 divides the plurality of keywords by a method different from the division method in step S84. For example, the system control unit 44 may divide the plurality of keywords into a partial search condition 2 including two keywords and a partial search condition 1 including the other keywords.

In step S86, if the system control unit 44 determines that the number of found items for sale is greater than or equal to T5 (step S86: YES), as a search means, the system control unit 44 searches for items for sale that match all the keywords included in the partial search condition 2 (step S90). The search method in this case is basically the same as that in step S82. Next, the system control unit 44 determines whether or not there is one or more partial search conditions 1*b* (step S91). At this time, if the system control unit 44 determines that there is one or more partial search conditions 1*b* (step S91: YES), as a search means, the system control unit 44 searches for items for sale that match all the keywords included in the partial search condition 1*b* for each partial search condition 1*b* (step S92). The search method in this case is basically the same as that in step S82.

If the system control unit 44 determines that there is no partial search condition 1*b* (step S91: NO) or when the system control unit 44 completes the process of step S92, as an extraction means, the system control unit 44 extracts combinations of items for sale related to each other from among combinations of any one of items for sale included in a corresponding sale item set that is found by using the partial search condition 1 and any one of items for sale included in a corresponding sale item set that is found by using the partial search condition 2 (step S93). Here, if the system control unit 44 searches for items for sale by using the partial search condition 1*b*, the system control unit 44 extracts combinations of items for sale related to each other from among combinations of any one of items for sale included in a corresponding sale item set that is found by using the partial search condition 1, any one of items for sale included in a corresponding sale item set that is found by using the partial search condition 2, and any one of items for sale included in a corresponding sale item set that is found by using the partial search condition 1*b*. Specifically, when the system control unit 44 extracts a plurality of items for sale in the same category, the system control unit 44 acquires a category ID from the sale item information of each item for sale. The system control unit 44 may identify a plurality of items for sale whose category IDs are the same between the corresponding sale item sets. In this case, whether or not the categories are the same is determined at the lowest level. The system control unit 44 may extract a plurality of items for sale in the same category at a level higher than the lowest level. This is because if whether or not the categories are the same is determined at a low level, a range of items for sale that belong to the same category may be small. The system control unit 44 can acquire a category ID of a category at a level higher than the lowest level for each item for sale on the basis of the category information registered in the category information DB 42b. For example, when the system control unit 44 extracts a plurality of items for sale which are sold by the same shop, the system control unit 44 acquires a shop ID from the sale item information of each item for sale. Then, the system control unit 44 identifies a plurality of items for sale whose shop IDs are the same between the corresponding sale item sets. For example, when the system control unit 44 extracts a plurality of items for sale in a relationship between a main item for sale and an optional item, the system control unit 44 acquires a product code from the sale item information of each item for sale. Then, the system control unit 44 identifies a plurality of items for sale whose product codes are registered in association with each other, in the related sale item information DB 42e, between the corresponding sale item sets.

After completing the process of step S93, the system control unit 44 determines whether or not one or more combinations are extracted (step S94). At this time, if the system control unit 44 determines that no combination is extracted (step S94: NO), the system control unit 44 proceeds to step S103.

On the other hand, if the system control unit 44 determines that one or more combinations are extracted (step S94: YES), the system control unit 44 selects one of the plurality of specified keywords (step S95). Next, the system control unit 44 determines whether or not the selected keyword includes a word representing an attribute value of any one of attribute items (step S96). For example, when the keyword includes characters of "yen" following one or more characters of a number, the system control unit 44 determines that the keyword includes a word representing a sale item price. Or, in this case, the system control unit 44 may determine that the keyword includes a word representing a total purchase cost. When the keyword includes words of "next day delivery" or the like, the system control unit 44 determines that the keyword includes a word representing a delivery method. When the keyword includes words of "free shipping" or the like, the system control unit 44 determines that the keyword includes a word representing a shipping fee. When the keyword includes characters of "percent" or "%" following one or more characters of a number, the system control unit 44 determines that the keyword includes a word representing a point provision rate. When the keyword includes words of "in stock" or the like or characters of "pieces" following one or more characters of a number, the system control unit 44 determines that the keyword includes a word representing a stock quantity. When the keyword includes a word of "evaluation" or the like, the system control unit 44 determines that the keyword includes a word representing an evaluation value.

If the system control unit 44 determines that the keyword includes a word representing an attribute value of any one of attribute items (step S96: YES), as a selection means, the system control unit 44 selects the attribute item where the keyword includes the word representing the attribute value as an advantage determination item (step S97). When the system control unit 44 completes the process of step S97 or determines that the keyword does not include a word representing an attribute value of any one of attribute items (step S96: NO), the system control unit 44 determines whether or not there are one or more keywords that have not yet been selected among the plurality of specified keywords (step S98). At this time, if the system control unit 44 determines that there are one or more keywords that have not yet been selected (step S98: YES), the system control unit 44 selects one of the keywords that have not yet been selected (step S99). Next, the system control unit 44 proceeds to step S96.

In step S98, if the system control unit 44 determines that all the keywords have been selected (step S98: NO), as an identification means, the system control unit 44 identifies advantageous combinations from among the extracted combinations (step S100).

Specifically, the system control unit 44 acquires an attribute value of an attribute item selected as the advantage determination item from the sale item information of each found item for sale and the sale item information of an item for sale included in each extracted combination. Next, the system control unit 44 selects an attribute value that is most commercially advantageous for the user among attribute values of an item for sale found independently as a reference attribute value. Next, the system control unit 44 determines an attribute value of each combination for the advantage determination item. The determination method of the attribute value of a combination is as described above. Here, when the advantage determination item is the shipping fee, the system control unit 44 calculates a sum of shipping fees of all items for sale included in a combination as the shipping fee of the combination. At this time, the system control unit 44 identifies a delivery destination prefecture from the address of the user of the user terminal 6 that has transmitted the search request. Then, the system control unit 44 calculates the shipping fee of each item for sale based on the delivery destination prefecture and the sale item shipping fee information of each item for sale. When the system control unit 44 determines that a plurality of items for sale sold by the same shop are included in the combination on the basis of the shop IDs included in the sale item information of each item for sale, the system control unit 44 acquires sizes from the sale item information of each of the plurality of items for sale and acquires the shop shipping fee information from the shop that sells the items for sale. Next, the system control unit 44 calculates a package size for collectively delivering a plurality of items for sale based on the sizes of each item for sale. Then, the system control unit 44 calculates the shipping fee for collectively delivering the items for sale based on the calculated package size, the address of the user, and the shop shipping fee information. When calculating a sum of the shipping fees, the system control unit 44 uses a shipping fee for collectively delivering items for sale instead of an individual shipping fee for a plurality of items for sale sold by the same shop. When the advantage determination item is the total purchase cost, the system control unit 44 calculates a sum of the sale item price calculated for the combination and the shipping fee calculated for the combination. When the system control unit 44 determines the attribute value of each combination, the system control unit 44 compares the attribute value of each combination with the reference attribute value. Then, the system control unit 44 identifies combinations, as the advantageous combinations, where the attribute value that is more commercially advantageous for the user than the reference attribute value is determined.

When a plurality of advantage determination items are selected, for example, the system control unit 44 may identify only combinations where the attribute value that is more commercially advantageous for the user than the reference attribute value is determined for all the advantage determination items. Or, the system control unit 44 may identify combinations where the attribute value that is more commercially advantageous for the user than the reference attribute value is determined for a part of the advantage determination items. When no advantage determination item is selected, for example, the system control unit 44 may identify combinations where the attribute value that is more commercially advantageous for the user than the reference attribute value is determined for a predetermined attribute item.

After completing the process of step S100, the system control unit 44 determines whether or not one or more combinations are identified as the advantageous combinations (step S101). At this time, if the system control unit 44 determines that no combination is identified (step S101: NO), the system control unit 44 proceeds to step S103.

On the other hand, if the system control unit 44 determines that one or more combinations are identified (step S101: YES), the system control unit 44 transmits an HTML document of a sale item search result page that displays a list of the items for sale that are found independently and the identified advantageous combinations to the user terminal 6 that is the transmission source of the search request (step S102). Specifically, the system control unit 44 generates data for displaying the sale item information display area 210 based on the sale item name, the URL of the sale item image, the sale item price, the sale item ID, and the like that are included in the sale item information of each item for sale that is found independently. In the same manner, the system control unit 44 generates data for displaying the sale item information display area 221 for each item for sale included in the advantageous combinations. Next, the system control unit 44 generates an HTML document including the data for displaying the sale item information display area 210 and the data for displaying the sale item information display area 221. Then, the system control unit 44 transmits the generated HTML document. In this way, as a providing means, the system control unit 44 provides information of the identified combinations to the user terminal 6. After completing this process, the system control unit 44 ends the search process. For example, as shown in FIG. 13, the user terminal 6 displays the sale item search result page based on the HTML document received from the online shopping mall server 4.

In step S89, the system control unit 44 may determine the partial search condition 1a to be the latest partial search condition 1 and integrate the partial search condition 1b with the partial search condition 2 generated by the division in step S84.

As described above, according to the present embodiment, the system control unit 44 of the online shopping mall server 4 divides a plurality of keywords specified as a search condition into partial search conditions 1 and 2, each of which includes at least one keyword, searches for items for sale that match all the keywords included in a partial search condition for each partial search condition and items for sale that match all the keywords included in the partial search conditions, extracts combinations of items for sale that have a predetermined relationship from among combinations of any one of items for sale found by the partial search condition 1 and any one of items for sale found by the partial search condition 2, identifies combinations that are more commercially advantageous for the user than items for sale that are found by the search condition from among the extracted combinations, and provides information of the identified combinations. Therefore, even if the user specifies a plurality of keywords as a search condition, it is possible to provide information of combinations of items for sale, which are more commercially advantageous for the user than items for sale that match all the specified keywords.

Further, when the number of items for sale found by the partial search condition 1 is smaller than T5, the system control unit 44 divides the partial search condition 1 into the partial search conditions 1a and 1b, searches for items for sale that match all the keywords included in the partial search condition 1a and items for sale that match all the keywords included in the partial search condition 1b, and extracts combinations of items for sale that are related to each other from among combinations of any one of items for sale found by the partial search condition 1a, any one of items for sale found by the partial search condition 1b, and any one of items for sale found by the partial search condition 2. Therefore, each of the partial search conditions 1a and 1b includes a smaller number of keywords than that of the partial search condition 1, so that there is a higher probability of finding items for sale when performing the search by using the partial search conditions 1a and 1b than when performing the search by using the partial search condition 1. Therefore, it is possible to more easily obtain a sufficient number of search results desired by the user.

The system control unit 44 includes one keyword by which the smallest number of items for sale are found among the plurality of keywords specified as the search condition in the partial search condition 2 and includes the keywords that are not included in the partial search condition 2 in the partial search condition 1. Therefore, it is possible to make the partial search condition 1 closer to the specified search condition as much as possible and increase the probability to be able to find items for sale by the partial search condition 1.

In the embodiments described above, the present invention is applied when accommodation facilities or items for sale are searched for as search objects. However, the present invention may be applied to a search for, for example, a facility other than an accommodation facility, a location, a service, a web page, an image, a moving image, a sound, a map, news, a blog, and the like.

In the embodiments described above, the search apparatus of the present invention is applied to a server device in a client-server system. Specifically, a terminal device transmits keywords specified by a user to a server device and the server device performs a search by using the received keywords. However, the present invention may be applied to a stand-alone device. Specifically, the search apparatus of the present invention may directly receive keywords specified by the user, perform a search by using the received keywords, and directly provide information of the advantageous combinations to the user by, for example, displaying a search result.

REFERENCE SIGNS LIST

1 Accommodation facility reservation server
2 Accommodation facility terminal
3 User terminal
11 Communication unit
12 Storage unit
12a Member information DB
12b Accommodation facility information DB
12c Region information DB 12c
12d Spot information DB
12e Accommodation facility keyword information DB 13 Input/output interface
14 System control unit
14a CPU
14b ROM
14c RAM
15 System bus
NW Network
S1 Information providing system
4 Online shopping mall server
5 Shop terminal
6 User terminal
41 Communication unit
42 Storage unit
42a Member information DB
42b Category information DB
42c Shop information DB
42d Sale item information DB
42e Related sale item information DB
43 Input/output interface
44 System control unit
44a CPU
44b ROM
44c RAM
45 System bus
S2 Information providing system

The invention claimed is:

1. A search apparatus comprising:
at least one memory operable to store program code;
at least one processor operable to read said program code and operate as instructed by said program code, said program code including:
dividing code that divides a plurality of keywords specified as a search condition into at least two child search conditions, a first child search condition among the at least two child search conditions including one or more first keywords among the plurality of keywords and a second child search condition among the at least two child search conditions including one or more second keywords among the plurality of keywords different from the one or more first keywords;
search code that searches for a search object matching all of the plurality of keywords specified as the search condition and retrieves as a first child search result one or more first search objects, each of the one or more first search objects individually matching all of the one or more first keywords included in the first child search condition, and retrieves as a second child search result one or more second search objects, each of the one or more second search objects individually matching all of the one or more second keywords included in the second child search condition;
extraction code that extracts one or more combinations of search objects based on the first child search result and the second child search result, each of the one or more combinations including one of the one or more combinations of search objects having a relationship with another of the one or more combinations of search objects, and each of the one or more combinations having an attribute value;
identification code that identifies one or more combinations as a third search result, from among the one or more combinations extracted by the extraction code, that has the attribute value satisfying a predetermined condition; and
providing code that provides information of the one or more combinations as the third search result identified by the identification code to display the one or combinations as the third search result such that the one or more combinations as the third search result are arranged in order according to the attribute value,
wherein the plurality of keywords specified as the search condition is to be used to search for a first facility,
wherein the first child condition is to be used to search for one or more facilities,
wherein the second child condition is to be used to search for one or more regions,
wherein the search code searches for the first facility matching all of the plurality of keywords specified as the search condition, retrieves as the first child search result the one or more facilities, and retrieves as the second child search result the one or more regions,
wherein the extraction code extracts the one or more combinations, each including one of the one or more facilities retrieved by the first child condition and one of the one or more regions retrieved by the second child condition,
wherein the attribute value indicates at least one of:
a first distance based on a first location of a user, a second location at which a second facility corresponding to the respective combination is located, and a third location of the one or more regions, and
a first cost for using the second facility corresponding to the respective combination,
wherein the first distance is i) a total distance from the first location to the second location and from the second location to the third location, or ii) a total distance from the first location to the third location and from the third location to the second location,
wherein a second distance is a total distance from the first location to a fourth location of the first facility matching all of the plurality of keywords specified as the search condition, the fourth location different from the third location,
wherein the first cost being a sum of:
a cost for using the second facility in the respective combination and
a cost for using a spot that is located in the region in the respective combination,
wherein a second cost is a cost for the first facility matching all of the plurality of keywords specified as the search condition, and
wherein the predetermined condition is at least one of:
the first distance being shorter than the second distance, or
the first cost being less than the second cost.

2. The search apparatus according to claim 1, wherein
the dividing code divides the first child search condition into at least two grandchild search conditions and integrates one of the at least two grandchild search conditions with the second child search condition when the number of search objects found by the first child search condition is smaller than a threshold number,
the search code searches for search objects matching all of the keywords included in the other of the at least two grandchild search conditions and search objects matching all of the keywords included in the second child search condition, and
the extraction code extracts combinations of search objects that are related to each other from among combinations of any one of search objects found by the other of the at least two grandchild search conditions and any one of search objects found by the second child search condition.

3. The search apparatus according to claim 1, wherein the dividing code includes one keyword by which the smallest number of search objects are found among the plurality of keywords in the second child search condition and includes the keywords that are not included in the second child search condition in the first child search condition.

4. The search apparatus according to claim 1, further comprising:
a selection code that selects an attribute item whose attribute value is represented by a word included in at least one of the plurality of keywords from among a plurality of attribute items of a search object,
wherein the identification code identifies the one or more combinations as the third search result having the attribute value, in the attribute item selected by the selection code, that satisfies the condition.

5. The search apparatus according to claim 2, further comprising:
a selection code that selects an attribute item whose attribute value is represented by a word included in at least one of the plurality of keywords from among a plurality of attribute items of a search object,
wherein the identification code identifies the one or more combinations as the third search result having the attribute value, in the attribute item selected by the selection code, that satisfies the condition.

6. The search apparatus according to claim 3, further comprising:
a selection code that selects an attribute item whose attribute value is represented by a word included in at least one of the plurality of keywords from among a plurality of attribute items of a search object,
wherein the identification code identifies the one or more combinations as the third search result having the attribute value, in the attribute item selected by the selection code, that satisfies the condition.

7. A search method performed by a search apparatus, the search method comprising:
dividing a plurality of keywords specified as a search condition into at least two child search conditions, a first child search condition among the at least two child search conditions including one or more first keywords among the plurality of keywords and a second child search condition among the at least two child search conditions including one or more second keywords among the plurality of keywords different from the one or more first keywords;
searching for a search object matching all of the plurality of keywords specified as the search condition and retrieving as a first child search result one or more first search objects, each of the one or more first search objects individually matching all of the one or more first keywords included in the first child search condition, and retrieving as a second child search result one or more second search objects, each of the one or more second search objects individually matching all of the one or more second keywords included in the second child search condition;
extracting one or more combinations of search objects based on the first child search result and the second child search result, each of the one or more combinations including one of the one or more combinations of search objects having a relationship with another of the one or more combinations of search objects, and each of the one or more combinations having an attribute value;
identifying one or more combinations as a third search result, from among the one or more combinations extracted, that has the attribute value satisfying a predetermined condition; and
providing information of the one or more combinations as the third search result identified in the identifying operation to display the one or combinations as the third search result such that the one or more combinations as the third search result are arranged in order according to the attribute value,
wherein the plurality of keywords specified as the search condition is to be used to search for a first facility,
wherein the first child condition is to be used to search for one or more facilities,
wherein the second child condition is to be used to search for one or more regions,
wherein the searching searches for the first facility matching all of the plurality of keywords specified as the search condition, retrieves as the first child search result the one or more facilities, and retrieves as the second child search result the one or more regions,
wherein the extracting extracts the one or more combinations, each including one of the one or more facilities retrieved by the first child condition and one of the one or more regions retrieved by the second child condition,
wherein the attribute value indicates at least one of:
a first distance based on a first location of a user, a second location at which a second facility corresponding to the respective combination is located, and a third location of the one or more regions, and
a first cost for using the second facility corresponding to the respective combination,
wherein the first distance is i) a total distance from the first location to the second location and from the second location to the third location or ii) a total distance from the first location to the third location and from the third location to the second location,
wherein a second distance is a total distance from the first location to a fourth location of the first facility matching all of the plurality of keywords specified as the search condition, the fourth location different from the third location,
wherein the first cost being a sum of:
a cost for using the second facility in the respective combination and
a cost for using a spot that is located in the region in the respective combination,
wherein a second cost is a cost for the first facility matching all of the plurality of keywords specified as the search condition, and
wherein the predetermined condition is at least one of:
the first distance being shorter than the second distance, or
the first cost being less than the second cost.

8. The search apparatus according to claim 1, wherein extraction code is further configured to extract as a first combination, a first search object and a second search object, the first search object extracted from among the search objects found by the first child search condition, and having the relationship to the second search object, among the search objects found by the second child search condition.

9. The method according to claim 7, wherein the extracting operation comprises extracting as a first combination, a first search object and a second search object, the first search object extracted from among the search objects found by the first child search condition, and having the relationship to the second search object, among the search objects found by the second child search condition.

10. The search apparatus according to claim 1, wherein each search object comprises a plurality of attribute items having an attribute value, and
the identification code identifies the one or more combinations as the third search result having the attribute value of a selected attribute item that satisfies the condition.

11. The search apparatus according to claim 1, wherein each the search objects found by the first child search condition and each of the search objects found by the second child search condition only match a part of the search condition.

12. The search apparatus according to claim 11, wherein the combinations of search objects having the relationship to each other, from among combinations of the search objects found by the first child search condition and the search objects found by the second child search condition, matches the search condition matching all of the plurality of keywords specified as the search condition.

13. The search apparatus according to claim 1, wherein each the search objects found by the first child search condition and each of the search objects found by the second child search condition does not match the entire search condition.

14. The search apparatus according to claim 13, wherein the combinations of search objects having the predetermined relationship to each other, from among combinations of the search objects found by the first child search condition and the search objects found by the second child search condition, matches the search condition matching all of the plurality of keywords specified as the search condition.

15. The search apparatus according to claim 1, wherein the identifying the combination further comprises:
comparing a first value of an attribute associated with each of the combinations with a second value of an attribute associated with the search object, and
determining one of the combinations having the first value closer to the condition than the second value as the combination.

16. The search apparatus according to claim 1, wherein the dividing code determines for each of the plurality of keywords whether or not the keyword is a keyword related to an item that is provided by a facility, includes a keyword determined to be related to the item in the first search child condition and includes a keyword determined not to be related to the item in the second search child condition.

17. The search apparatus according to claim 1, wherein when a location of any first facility among the one or more facilities found by the first child search condition is within a distance of any first region among the one or more regions found by the second child search condition, the extraction code extracts a combination of the first facility and the first region that have the relationship to each other.

18. The search apparatus according to claim 1,
wherein the search code retrieves the one or more regions matching all of the one or more second keywords included in the second child search condition from a first set of regions, and
when a number of the one or more regions retrieved by the second child search condition from the first set of regions is less than a threshold number:
the search code further retrieves one or more regions matching all of the one or more second keywords included in the second child search condition from a second set of regions that cover an area larger than the first set of regions, and
the extraction code extracts the one or more combinations each including one of the one or more facilities retrieved by the first child search condition and one of the one or more regions retrieved by the second child search condition from the second set of regions.

19. The search apparatus according to claim 18, wherein the first set of regions is a set of municipalities, and wherein each of the second set of regions is formed by integrating a plurality of municipalities.

20. The search apparatus according to claim 18, wherein each region of the second set of regions includes more than one region of the first set of regions.

* * * * *